United States Patent
Jeong et al.

(10) Patent No.: US 11,259,044 B2
(45) Date of Patent: Feb. 22, 2022

(54) METHOD FOR ENCODING AND DECODING MOTION INFORMATION, AND APPARATUS FOR ENCODING AND DECODING MOTION INFORMATION

(71) Applicant: SAMSUNG ELECTRONICS CO., LTD., Suwon-si (KR)

(72) Inventors: Seungsoo Jeong, Suwon-si (KR); Minsoo Park, Suwon-si (KR); Minwoo Park, Suwon-si (KR); Kiho Choi, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/272,537

(22) PCT Filed: Sep. 17, 2019

(86) PCT No.: PCT/KR2019/012000
§ 371 (c)(1),
(2) Date: Mar. 1, 2021

(87) PCT Pub. No.: WO2020/060158
PCT Pub. Date: Mar. 26, 2020

(65) Prior Publication Data
US 2021/0329292 A1    Oct. 21, 2021

Related U.S. Application Data

(60) Provisional application No. 62/743,025, filed on Oct. 9, 2018, provisional application No. 62/732,224, filed on Sep. 17, 2018.

(51) Int. Cl.
*H04N 11/02*    (2006.01)
*H04N 19/56*    (2014.01)
(Continued)

(52) U.S. Cl.
CPC .......... *H04N 19/56* (2014.11); *H04N 19/109* (2014.11); *H04N 19/176* (2014.11)

(58) Field of Classification Search
CPC ..................................................... H04N 19/56
(Continued)

(56) References Cited

U.S. PATENT DOCUMENTS 10,362,313 B2   7/2019   Alshina et al.
10,531,116 B2   1/2020   Li et al.
(Continued)

FOREIGN PATENT DOCUMENTS

JP   2017-508346 A   3/2017
JP   2017-537529 A   12/2017
(Continued)

OTHER PUBLICATIONS

Esenlik, Semih et al., CE9: DMVR with Motion Vector Difference Mirroring (Test 1.6), Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0216-v3. (5 pages total).
(Continued)

*Primary Examiner* — Leron Beck
(74) *Attorney, Agent, or Firm* — Sughrue Mion, PLLC

(57) ABSTRACT

Provided is a video decoding method including: determining a prediction mode of a current block to be one of a skip mode and a merge mode; when a motion vector, which is determined from a merge candidate list of the current block, and a merge motion vector difference are to be used, obtaining merge candidate information indicating one candidate in the merge candidate list by performing entropy encoding on a bitstream by applying one piece of context information; determining a base motion vector from one candidate determined from the merge candidate list, based on the merge
(Continued)

candidate information; and determining a motion vector of the current block by using a distance index of a merge motion vector difference of the current block and a direction index of the merge motion vector difference to use the base motion vector and the merge motion vector difference.

4 Claims, 30 Drawing Sheets

(51) Int. Cl.
*H04N 19/109* (2014.01)
*H04N 19/176* (2014.01)

(58) Field of Classification Search
USPC ..................................... 375/240.01–240.29
See application file for complete search history.

(56) References Cited

U.S. PATENT DOCUMENTS

| | | | |
|---|---|---|---|
| 10,602,179 B2 | 3/2020 | Jeong et al. | |
| 2014/0146876 A1* | 5/2014 | Takehara | H04N 19/109 |
| | | | 375/240.02 |
| 2014/0169474 A1* | 6/2014 | Kang | H04N 19/11 |
| | | | 375/240.16 |
| 2014/0205014 A1* | 7/2014 | Nakamura | H04N 19/577 |
| | | | 375/240.16 |
| 2015/0195552 A1* | 7/2015 | Hendry | H04N 19/174 |
| | | | 375/240.12 |
| 2015/0341664 A1* | 11/2015 | Zhang | H04N 19/597 |
| | | | 375/240.12 |
| 2018/0176596 A1 | 6/2018 | Jeong et al. | |
| 2020/0154134 A1 | 5/2020 | Park et al. | |
| 2020/0169746 A1 | 5/2020 | Jeong et al. | |
| 2021/0218984 A1 | 7/2021 | Jeong et al. | |

FOREIGN PATENT DOCUMENTS

| | | |
|---|---|---|
| KR | 10-2014-0011473 A | 1/2014 |
| KR | 10-2016-0143584 A | 12/2016 |
| KR | 10-2017-0078672 A | 7/2017 |
| KR | 10-2018-0097773 A | 8/2018 |

OTHER PUBLICATIONS

International Search Report (PCT/ISA/210) dated Dec. 24, 2019 by the International Searching Authority in counterpart International Patent Application No. PCT/KR2019/012000.

International Preliminary Report on Patentability (PCT/IPEA/409) dated Dec. 22, 2020 by the International Searching Authority in counterpart International Patent Application No. PCT/KR2019/012000.

Communication dated May 17, 2021 issued by the Korean Intellectual Property Office in counterpart Korean Application No. 10-2020-7031941.

* cited by examiner

FIG. 4
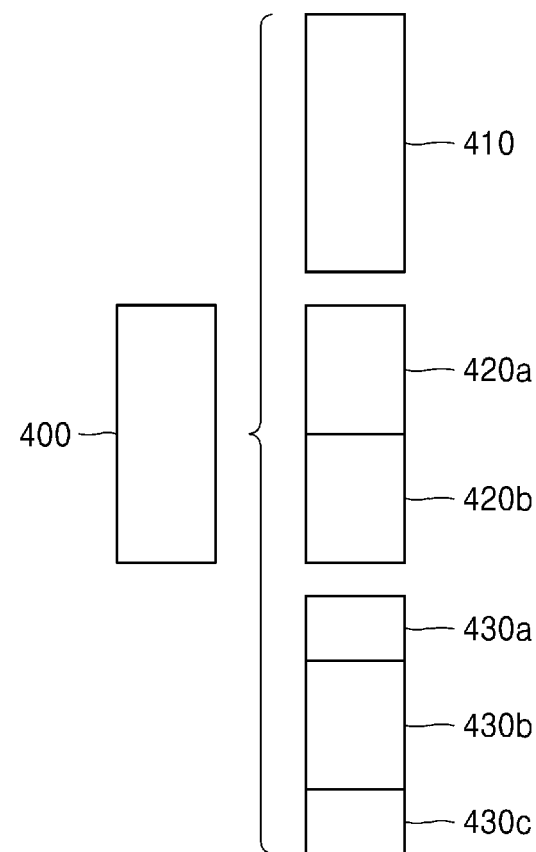
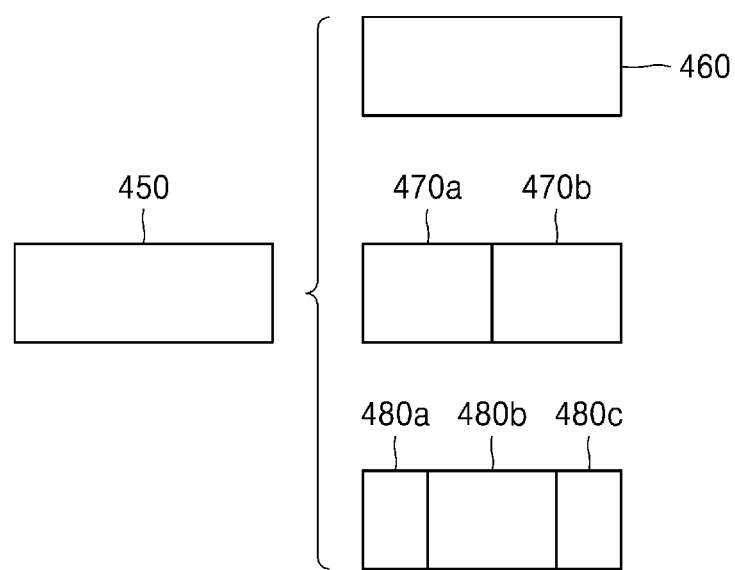

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 21
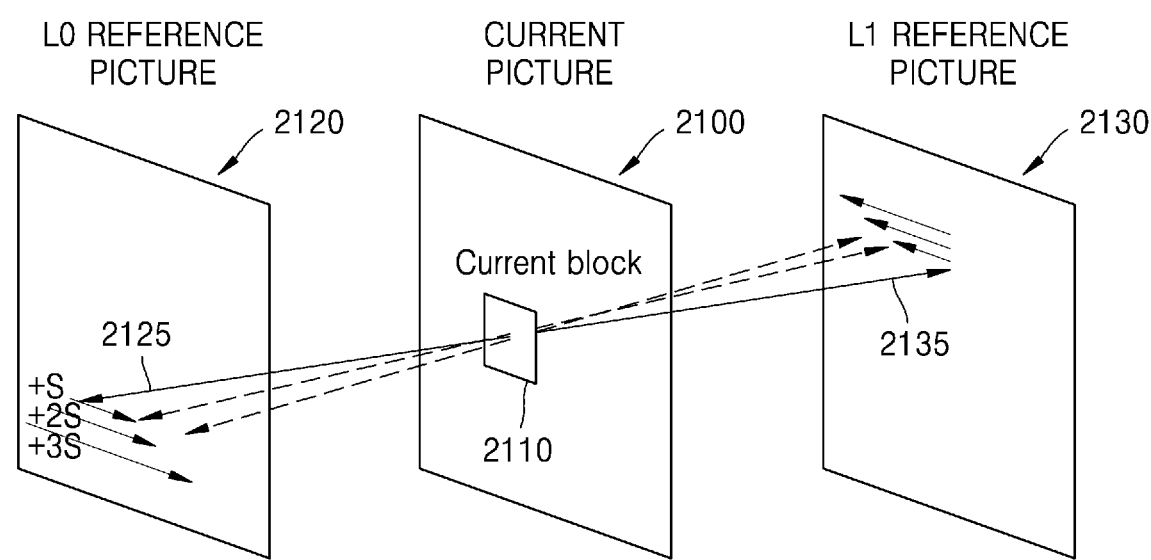
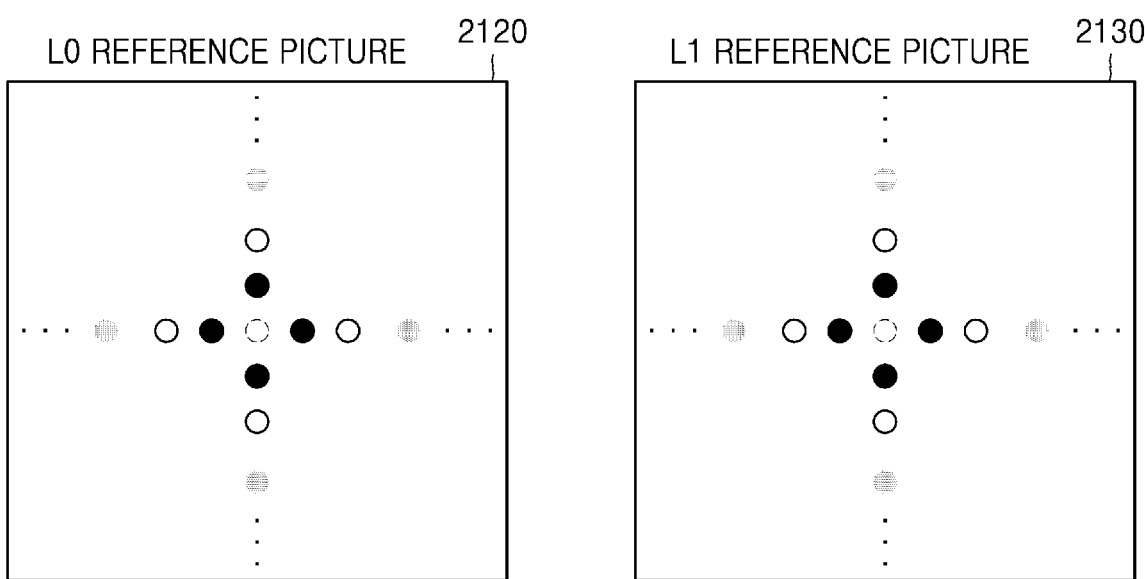

FIG. 26

| MERGE CANDIDATE INFORMATION | 0 | 1 | 2 | 3 |
|---|---|---|---|---|
| $N^{th}$ MV CANDIDATE | $1^{st}$ MV CANDIDATE | $2^{nd}$ MV CANDIDATE | $3^{rd}$ MV CANDIDATE | $4^{th}$ MV CANDIDATE |

2600

| MERGE DIFFERENTIAL DISTANCE INDEX | BINARY STRING | DISTANCE FROM BASE MOTION VECTOR |
|---|---|---|
| 0 | 0 | 1 |
| 1 | 10 | 2 |
| 2 | 110 | 4 |
| 3 | 1110 | 8 |
| 4 | 11110 | 16 |
| 5 | 111110 | 32 |
| 6 | 1111110 | 64 |
| 7 | 1111111 | 128 |

2610

| MERGE DIFFERENTIAL DIRECTION INDEX | BINARY STRING | X AXIS SIGN | Y AXIS SIGN |
|---|---|---|---|
| 0 | 00 | +1 | 0 |
| 1 | 01 | −1 | 0 |
| 2 | 10 | 0 | +1 |
| 3 | 11 | 0 | −1 |

2620

FIG. 27 mvLX[ 0 ][ 0 ][ 0 ] = mvLXN[ 0 ] + refineMvLX[0]

mvLX[ 0 ][ 0 ][ 1 ] = mvLXN[ 1 ] + refineMvLX[1]

FIG. 28

| coding_unit( x0, y0, cbWidth, cbHeight, treeType ) { | Descriptor |
|---|---|
|   if( slice_type != I ) { | |
|     cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     if( treeType = = SINGLE_TREE \|\| treeType = = DUAL_TREE_LUMA ) { | |
|       intra_luma_mpm_flag[ x0 ][ y0 ] | |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType = = SINGLE_TREE \|\| treeType = = DUAL_TREE_CHROMA ) | |
|       intra_chroma_pred_mode[ x0 ][ y0 ] | ae(v) |
|   } else { /* MODE_INTER */ | |
|     if( cu_skip_flag[ x0 ][ y0 ] ) { | |
|       umve_flag[ x0 ][ y0 ] | ae(v) |
|       if( umve_flag[ x0 ][ y0 ] = = 1 ) | |
|         umve_idx_coding ( x0, y0) | |
|       else if( merge_affine_flag[ x0 ][ y0 ] = = 0 && MaxNumMergeCand > 1 ) | |
|         merge_idx[ x0 ][ y0 ] | ae(v) |
|     } else { | |
|       merge_flag[ x0 ][ y0 ] | ae(v) |
|       if( merge_flag[ x0 ][ y0 ] ) { | |
|         umve_flag[ x0 ][ y0 ] | ae(v) |
|         if( umve_flag[ x0 ][ y0 ] = = 1 ) | |
|           umve_idx_coding ( x0, y0 ) | |
|         else if(merge_affine_flag[ x0 ][ y0 ] = = 0 && MaxNumMergeCand > 1 ) | |
|           merge_idx[ x0 ][ y0 ] | ae(v) |
|       } else { | |
|         if( slice_type = = B ) | |
|           inter_pred_idc[ x0 ][ y0 ] | ae(v) |
|         if( sps_affine_enabled_flag && cbWidth >= 16 && cbHeight >= 16 ) { | |
|           inter_affine_flag[ x0 ][ y0 ] | ae(v) |
|           if( sps_affine_type_flag && inter_affine_flag[ x0 ][ y0 ] ) | |
|             cu_affine_type_flag[ x0 ][ y0 ] | ae(v) |
|         } | |
|   } | |

| umve_idx_coding ( x0, y0 ) { | Descriptor |
|---|---|
|   base_mv_idx[ x0 ][ y0 ] | ae(v) |
|   distance_idx[ x0 ][ y0 ] | ae(v) |
|   direction_idx[ x0 ][ y0 ] | ae(v) |
| } | |

FIG. 29

| merge_data( x0, y0, cbWidth, cbHeight, chType ) { | Descriptor |
|---|---|
|   if ( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight ) >= 64 && ( (sps_ciip_enabled_flag && <br>          cu_skip_flag[ x0 ][ y0 ] = = 0 && cbWidth < 128 && cbHeight < 128) \|\| <br>        ( sps_triangle_enabled_flag && MaxNumTriangleMergeCand > 1 && <br>          slice_type = = B ) ) ) | |
|         regular_merge_flag[ x0 ][ y0 ] | ae(v) |
|       if ( regular_merge_flag[ x0 ][ y0 ] = = 1 ){ | |
|         if( sps_mmvd_enabled_flag ) | |
|           mmvd_merge_flag[ x0 ][ y0 ] | ae(v) |
|         if( mmvd_merge_flag[ x0 ][ y0 ] = = 1 ) { | |
|           if( MaxNumMergeCand > 1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( MaxNumMergeCand > 1 ) | |
|             merge_idx[ x0 ][ y0 ] | ae(v) |
|         } | |
|       } else { | |
|         if( sps_ciip_enabled_flag && sps_triangle_enabled_flag && <br>          MaxNumTriangleMergeCand > 1 && slice_type = = B && <br>          cu_skip_flag[ x0 ][ y0 ] = = 0 && ( cbWidth * cbHeight ) >= 64 && <br>          cbWidth < 128 && cbHeight < 128 ) { | |
|           ciip_flag[ x0 ][ y0 ] | ae(v) |
|         if( ciip_flag[ x0 ][ y0 ] && MaxNumMergeCand > 1 ) | |
|           merge_idx[ x0 ][ y0 ] | ae(v) |
|         if( !ciip_flag[ x0 ][ y0 ] && MaxNumTriangleMergeCand > 1 ) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|       } | |
|     } | |
|   } | |
| } | |

FIG. 30

| Syntax element | binIdx | | | | | |
|---|---|---|---|---|---|---|
| | 0 | 1 | 2 | 3 | 4 | >= 5 |
| general_merge_flag[ ][ ] | 0 | na | na | na | na | na |
| regular_merge_flag[ ][ ] | cu_skip_flag[ ][ ] ? 0 : 1 | na | na | na | na | na |
| mmvd_merge_flag[ ][ ] | 0 | na | na | na | na | na |
| mmvd_cand_flag[ ][ ] | 0 | na | na | na | na | na |
| mmvd_distance_idx[ ][ ] | 0 | bypass | bypass | bypass | bypass | bypass |
| mmvd_direction_idx[ ][ ] | bypass | bypass | na | na | na | na |
| merge_idx[ ][ ] | 0 | bypass | bypass | bypass | bypass | na |

METHOD FOR ENCODING AND DECODING MOTION INFORMATION, AND APPARATUS FOR ENCODING AND DECODING MOTION INFORMATION

CROSS-REFERENCE TO RELATED APPLICATIONS

This application is a National Stage of International Application No. PCT/KR2019/012000, filed Sep. 17, 2019, claiming priority based on U.S. Provisional Patent Application No. 62/732,224, filed Sep. 17, 2018, and claiming priority based on U.S. Provisional Patent Application No. 62/743,025, filed Oct. 9, 2018, the contents of all of which are incorporated herein by reference in their entirety.

TECHNICAL FIELD

The present disclosure relates to the fields of image encoding and decoding. In particular, the present disclosure relates to a method and apparatus for encoding motion information used to encode and decode an image and a method and apparatus for decoding the motion information.

BACKGROUND ART

In methods of encoding and decoding an image, one picture may be split into blocks to encode the image and each block may be prediction-encoded via inter-prediction or intra-prediction.

A representative example of inter-prediction is motion estimation encoding using a method of compressing an image by removing temporal redundancy between pictures. In motion estimation encoding, blocks of a current picture are predicted by using at least one reference picture. A reference block most similar to a current block may be searched for in a certain search range by using a certain evaluation function. The current block is predicted based on the reference block and a residual block is generated by subtracting a prediction block generated as a result of the prediction from the current block and then encoded. Here, to further accurately perform the prediction, interpolation is performed on a search range of reference pictures so as to generate pixels of sub pel units smaller than integer pel units and inter-prediction may be performed based on the generated pixels of sub pel units.

In a codec such as H.264 advanced video coding (AVC) and high efficiency video coding (HEVC), a motion vector of pre-encoded blocks adjacent to a current block or blocks included in a pre-encoded picture is used as a prediction motion vector of the current block so as to predict a motion vector of the current block. A differential motion vector that is a difference between the motion vector of the current block and the prediction motion vector is signaled to a decoder via a certain method.

DESCRIPTION OF EMBODIMENTS

Technical Problem

Technical problems of methods of encoding and decoding motion information, and apparatuses for encoding and decoding motion information, according to an embodiment, are to efficiently perform entropy encoding/decoding on motion information.

Solution to Problem

A method of decoding motion information, according to an embodiment of the present disclosure, includes: determining a prediction mode of a current block to be one of a skip mode and a merge mode; when a motion vector, which is determined from a merge candidate list of the current block, and a merge motion vector difference are to be used, obtaining merge candidate information indicating one candidate in the merge candidate list by performing entropy encoding on a bitstream by applying one piece of context information; determining a base motion vector from one candidate determined from the merge candidate list, based on the merge candidate information; and determining a motion vector of the current block by using a distance index of a merge motion vector difference of the current block and a direction index of the merge motion vector difference to use the base motion vector and the merge motion vector difference.

In the method of decoding motion information according to an embodiment, context information for obtaining merge difference mode information in the skip mode and context information for obtaining the merge difference mode information in the merge mode may be the same.

Advantageous Effects of Disclosure

Methods of encoding and decoding motion information, and apparatuses for encoding and decoding motion information, according to an embodiment, may use simplified context information for efficiently performing entropy encoding/decoding on motion information.

However, effects achievable by methods of encoding and decoding motion information and apparatuses for encoding and decoding motion information, according to an embodiment, are not limited to those mentioned above, and other effects that not mentioned could be clearly understood by one of ordinary skill in the art from the following description.

BRIEF DESCRIPTION OF DRAWINGS

A brief description of each drawing is provided to better understand the drawings cited herein.

FIG. 4 illustrates a process, performed by an image decoding apparatus, of determining at least one coding unit by splitting a non-square coding unit, according to an embodiment.

FIG. 13 illustrates a process of determining a depth of a coding unit when a shape and size of the coding unit change, when the coding unit is recursively split such that a plurality of coding units are determined, according to an embodiment.

FIG. 21 illustrates positions of motion vector candidates, according to an embodiment.

FIG. 26 illustrate values and meanings of merge candidate information, merge differential distance indexes, and merge differential direction indexes, according to an embodiment.

FIG. 27 illustrates equations for obtaining a motion vector by using a base motion vector and a merge motion vector difference, according to an embodiment.

FIG. 28 illustrates syntaxes for obtaining merge difference mode information, merge candidate information, merge differential distance indexes, and merge differential direction indexes, according to an embodiment.

FIG. 29 illustrates syntaxes for obtaining merge difference mode information, merge candidate information, merge differential distance indexes, and merge differential direction indexes, according to another embodiment.

FIG. 30 is a reference table for determining context information of merge-related information, according to an embodiment.

BEST MODE

Figure 1:
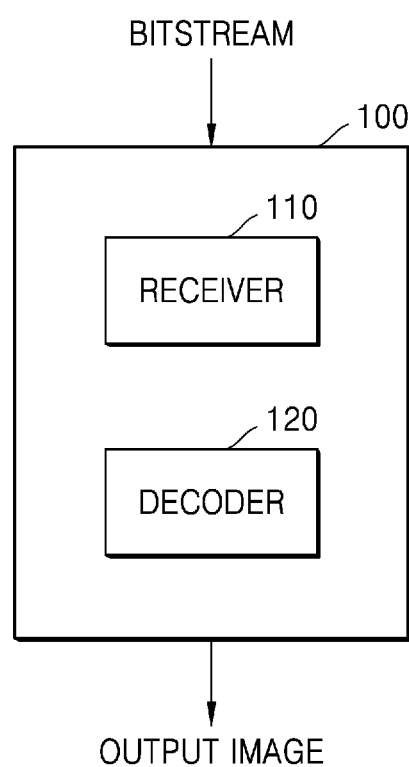
FIG. 1 is a schematic block diagram of an image decoding apparatus according to an embodiment.

A method of decoding motion information, according to an embodiment of the present disclosure, includes: determining a prediction mode of a current block to be one of a skip mode and a merge mode; when a motion vector, which is determined from a merge candidate list of the current block, and a merge motion vector difference are to be used, obtaining merge candidate information indicating one candidate in the merge candidate list by performing entropy encoding on a bitstream by applying one piece of context information; determining a base motion vector from one candidate determined from the merge candidate list, based on the merge candidate information; and determining a motion vector of the current block by using a distance index of a merge motion vector difference of the current block and a direction index of the merge motion vector difference to use the base motion vector and the merge motion vector difference.

According to an embodiment, the determining of the prediction mode of the current block to be one of the skip mode and the merge mode may include: when the prediction mode of the current block is the skip mode, obtaining merge difference mode information indicating whether the motion vector, which is determined from the merge candidate list of the current block, and the merge motion vector difference are to be used; and when the prediction mode of the current block is the merge mode, obtaining the merge difference mode information indicating whether the motion vector, which is determined from the merge candidate list of the current block, and the merge motion vector difference are to be used, wherein context information for obtaining the merge difference mode information in the skip mode and context information for obtaining the merge difference mode information in the merge mode may be the same.

According to an embodiment, the determining of the motion vector of the current block may include obtaining two bins indicating the direction index of the merge motion vector difference by performing the entropy decoding on the bitstream via a bypass mode.

According to an embodiment, the merge candidate information that is one bit of information may be obtained via the entropy decoding of applying the one piece of context information to the bitstream.

According to an embodiment, when prediction is performed in the merge mode, a number of pieces of context information required to obtain a general merge index indicating one candidate in the merge candidate list and a number of pieces of context information required to obtain the merge candidate information may be the same.

According to an embodiment, the pieces of merge difference mode information for determining whether the motion vector, which is determined from the merge candidate list of the current block, and the merge motion vector difference are to be used in the skip mode and the merge mode, may be determined via a same syntax element.

An apparatus for decoding motion information according to an embodiment of the present disclosure includes: an inter-prediction information obtainer configured to determine a prediction mode of a current block to be one of a skip mode and a merge mode, and when a motion vector, which is determined from a merge candidate list of the current block, and a merge motion vector difference are to be used, obtaining merge candidate information indicating one candidate in the merge candidate list by performing entropy decoding on a bitstream by applying one piece of context information; an inter-prediction performer configured to determine a base motion vector from one candidate determined in the merge candidate list based on the merge candidate information, and determine a motion vector of the current block by using a distance index of a merge motion vector difference of the current block and a direction index of the merge motion vector difference to use the base motion vector and the merge motion vector difference; and a reconstructor configured to reconstruct the current block by using the motion vector.

The inter-prediction information obtainer according to an embodiment may be further configured to: when the prediction mode of the current block is the skip mode, obtain merge difference mode information indicating whether the motion vector, which is determined from the merge candidate list of the current block, and the merge motion vector difference are to be used; and when the prediction mode of the current block is the merge mode, obtain the merge difference mode information indicating whether the motion vector, which is determined from the merge candidate list of the current block, and the merge motion vector difference are to be used, wherein context information for obtaining the merge difference mode information in the skip mode and context information for obtaining the merge difference mode information in the merge mode may be the same.

The inter-prediction information obtainer according to an embodiment may be further configured to obtain two bins indicating the direction index of the merge motion vector difference by performing the entropy decoding on the bitstream via a bypass mode.

The inter-prediction information obtainer according to an embodiment may be further configured to obtain the merge candidate information that is one bit of information via the entropy decoding of applying the one piece of context information to the bitstream.

In the apparatus for decoding motion information, according to an embodiment, when prediction is performed in the merge mode, a number of pieces of context information required to obtain a general merge index indicating one candidate in the merge candidate list and a number of pieces of context information required to obtain the merge candidate information may be the same.

In the apparatus for decoding motion information, according to an embodiment, the pieces of merge difference mode information for determining whether the motion vector, which is determined from the merge candidate list of the current block, and the merge motion vector difference are to be used in the skip mode and the merge mode, may be determined via a same syntax element.

A method of encoding motion information, according to an embodiment of the present disclosure, includes: when inter-prediction is performed on a current block in one of a skip mode and a merge mode, determining whether a base motion vector, which is determined from a merge candidate list of the current block, and a merge motion vector difference are to be used; when the merge motion vector difference is to be used, generating merge candidate information indicating one base motion vector in the merge candidate list by performing entropy encoding on a bitstream by applying one piece of context information; and generating a distance index of the merge motion vector difference corresponding to a difference between the base motion vector and a motion vector of the current block, and a direction index of the merge motion vector difference.

An apparatus for encoding motion information, according to an embodiment of the present disclosure, includes: an inter-prediction performer configured to determine a motion vector of a current block by performing inter-prediction on the current block; and an inter-prediction information generator configured to, when the inter-prediction is performed on the current block in one of a skip mode and a merge mode, determine whether a base motion vector, which is determined from a merge candidate list of the current block, and a merge motion vector difference are to be used, when the merge motion vector difference is to be used, generate merge candidate information indicating the base motion vector in the merge candidate list by performing entropy encoding on a bitstream by applying one piece of context information, and generate a distance index of the merge motion vector difference corresponding to a difference between the base motion vector and the motion vector of the current block, and a direction index of the merge motion vector difference.

MODE OF DISCLOSURE

As the present disclosure allows for various changes and numerous examples, particular embodiments will be illustrated in the drawings and described in detail in the written description. However, this is not intended to limit the present disclosure to particular modes of practice, and it will be understood that all changes, equivalents, and substitutes that do not depart from the spirit and technical scope of various embodiments are encompassed in the present disclosure.

In the description of embodiments, certain detailed explanations of related art are omitted when it is deemed that they may unnecessarily obscure the essence of the present disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image of a video or a moving image, i.e., the video itself.

Also, in the present specification, a 'sample' denotes data assigned to a sampling position of an image, i.e., data to be processed. For example, pixel values of an image in a spatial domain and transform coefficients on a transform region may be samples. A unit including at least one such sample may be defined as a block.

Also, in the present specification, a 'current block' may denote a block of a largest coding unit, coding unit, prediction unit, or transform unit of a current image to be encoded or decoded.

In the present specification, a motion vector in a list 0 direction may denote a motion vector used to indicate a block in a reference picture included in a list 0, and a motion vector in a list 1 direction may denote a motion vector used to indicate a block in a reference picture included in a list 1. Also, a motion vector in a unidirection may denote a motion vector used to indicate a block in a reference picture included in a list 0 or list 1, and a motion vector in a bidirection may denote that the motion vector includes a motion vector in a list 0 direction and a motion vector in a list 1 direction.

Hereinafter, an image encoding apparatus and an image decoding apparatus, and an image encoding method and an image decoding method according to embodiments will be described with reference to FIGS. 1 through 16. A method of determining a data unit of an image, according to an embodiment, will be described with reference to FIGS. 3 through 16, and a video encoding/decoding method in which an inter-prediction method is expanded by using a probability motion expression method according to an embodiment will be described with reference to FIGS. 17 through 30.

Hereinafter, a method and apparatus for adaptive selection based on various shapes of coding units, according to an embodiment of the present disclosure, will be described with reference to FIGS. 1 and 2.

FIG. 1 is a schematic block diagram of an image decoding apparatus according to an embodiment.

An image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2200 described later. Also, the bitstream may be transmitted from the image encoding apparatus 2200. The image encoding apparatus 2200 and the image decoding apparatus 100 may be connected via wires or wirelessly, and the receiver 110 may receive the bitstream via wires or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
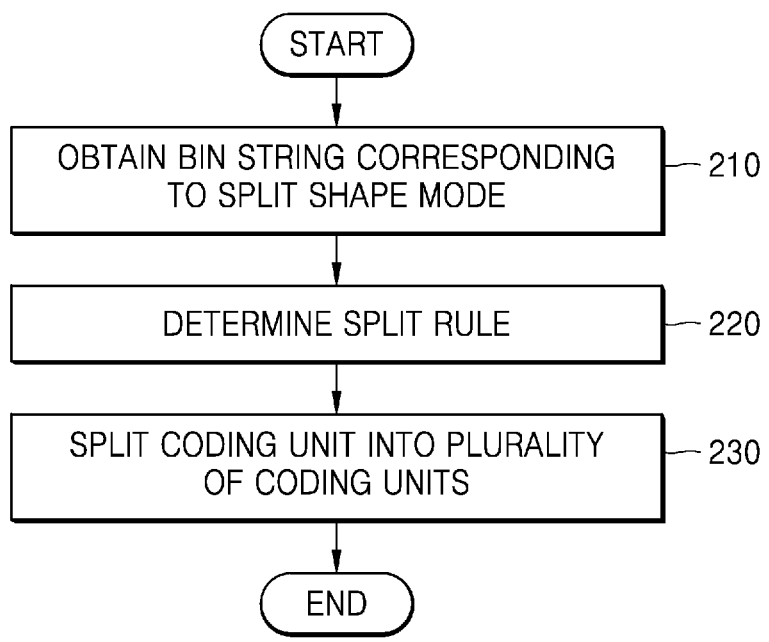
FIG. 2 is a flowchart of an image decoding method according to an embodiment.

FIG. 2 is a flowchart of an image decoding method according to an embodiment.

According to an embodiment of the present disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of the coding unit (operation 220). Also, the image decoding apparatus 100 splits the coding unit into a plurality of coding units, based on at least one of the bin string corresponding to the split shape mode and the split rule (operation 230). The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the present disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding unit (CTB) denotes an N×N block including N×N samples (N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a certain size including a certain number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, an embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode SPLIT_TT_VER.

The image decoding apparatus 100 may obtain, from the bitstream, the split shape mode information from one bin string. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape code information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transform may be performed by using a coding unit as a transform block.

The splitting of the coding unit will be described in detail with reference to FIGS. 3 through 16. A current block and a neighboring block of the present disclosure may indicate one of the largest coding unit, the coding unit, the prediction block, and the transform block. Also, the current block of the current coding unit is a block that is currently being decoded or encoded or a block that is currently being split. The neighboring block may be a block reconstructed before the current block. The neighboring block may be adjacent to the current block spatially or temporally. The neighboring block may be located at one of the lower left, left, upper left, top, upper right, right, lower right of the current block.

Figure 3:
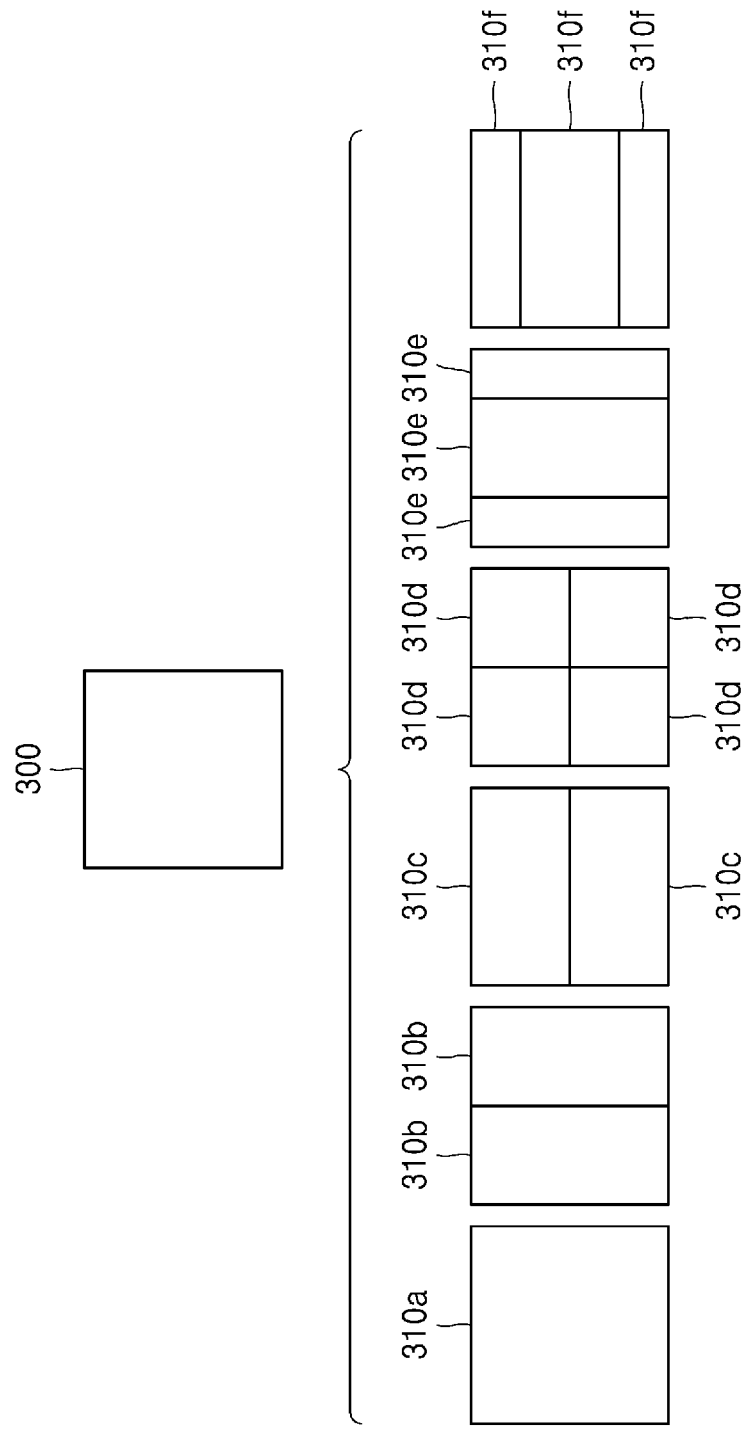
FIG. 3 illustrates a process, performed by an image decoding apparatus, of determining at least one coding unit by splitting a current coding unit, according to an embodiment.

FIG. 3 illustrates a process, performed by an image decoding apparatus, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 2200 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not split, based on the split shape mode information indicating not to perform splitting, or may determine coding units 310b, 310c, 310d, 310e, or 310f split based on the split shape mode information indicating a certain splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary-splitting in a vertical direction. The image decoding apparatus 100 may determine three coding units 310f obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Certain splitting methods of splitting the square coding unit will be described in detail below in relation to various embodiments.

FIG. 4 illustrates a process, performed by an image decoding apparatus, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a certain splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450 is not split, based on the split shape mode information indicating not to perform splitting, or determine coding units 420a and 420b, 430a to 430c, 470a and 470b, or 480a to 480c split based on the split shape mode information indicating a certain splitting method. Certain splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting a long side of the current coding unit 400 or 450, in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430*a*, 430*b*, and 430*c*, or 480*a*, 480*b*, and 480*c*.

According to an embodiment, a ratio of the width and height of the current coding unit 400 or 450 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430*a* to 430*c* by splitting the current coding unit 400 in the horizontal direction. Also, when the current coding unit 450 is in the horizontal direction, the image decoding apparatus 100 may determine the coding units 480*a* to 480*c* by splitting the current coding unit 450 in the vertical direction.

According to an embodiment, the image decoding apparatus 100 may determine the odd number of coding units included in the current coding unit 400 or 450, and not all the determined coding units may have the same size. For example, a certain coding unit 430*b* or 480*b* from among the determined odd number of coding units 430*a*, 430*b*, and 430*c*, or 480*a*, 480*b*, and 480*c* may have a size different from the size of the other coding units 430*a* and 430*c*, or 480*a* and 480*c*. That is, coding units which may be determined by splitting the current coding unit 400 or 450 may have multiple sizes and, in some cases, all of the odd number of coding units 430*a*, 430*b*, and 430*c*, or 480*a*, 480*b*, and 480*c* may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a certain restriction on at least one coding unit from among the odd number of coding units generated by splitting the current coding unit 400 or 450. Referring to FIG. 4, the image decoding apparatus 100 may set a decoding process regarding the coding unit 430*b* or 480*b* located at the center among the three coding units 430*a*, 430*b*, and 430*c* or 480*a*, 480*b*, and 480*c* generated as the current coding unit 400 or 450 is split to be different from that of the other coding units 430*a* and 430*c*, or 480*a* or 480*c*. For example, the image decoding apparatus 100 may restrict the coding unit 430*b* or 480*b* at the center location to be no longer split or to be split only a certain number of times, unlike the other coding units 430*a* and 430*c*, or 480*a* and 480*c*.

Figure 5:
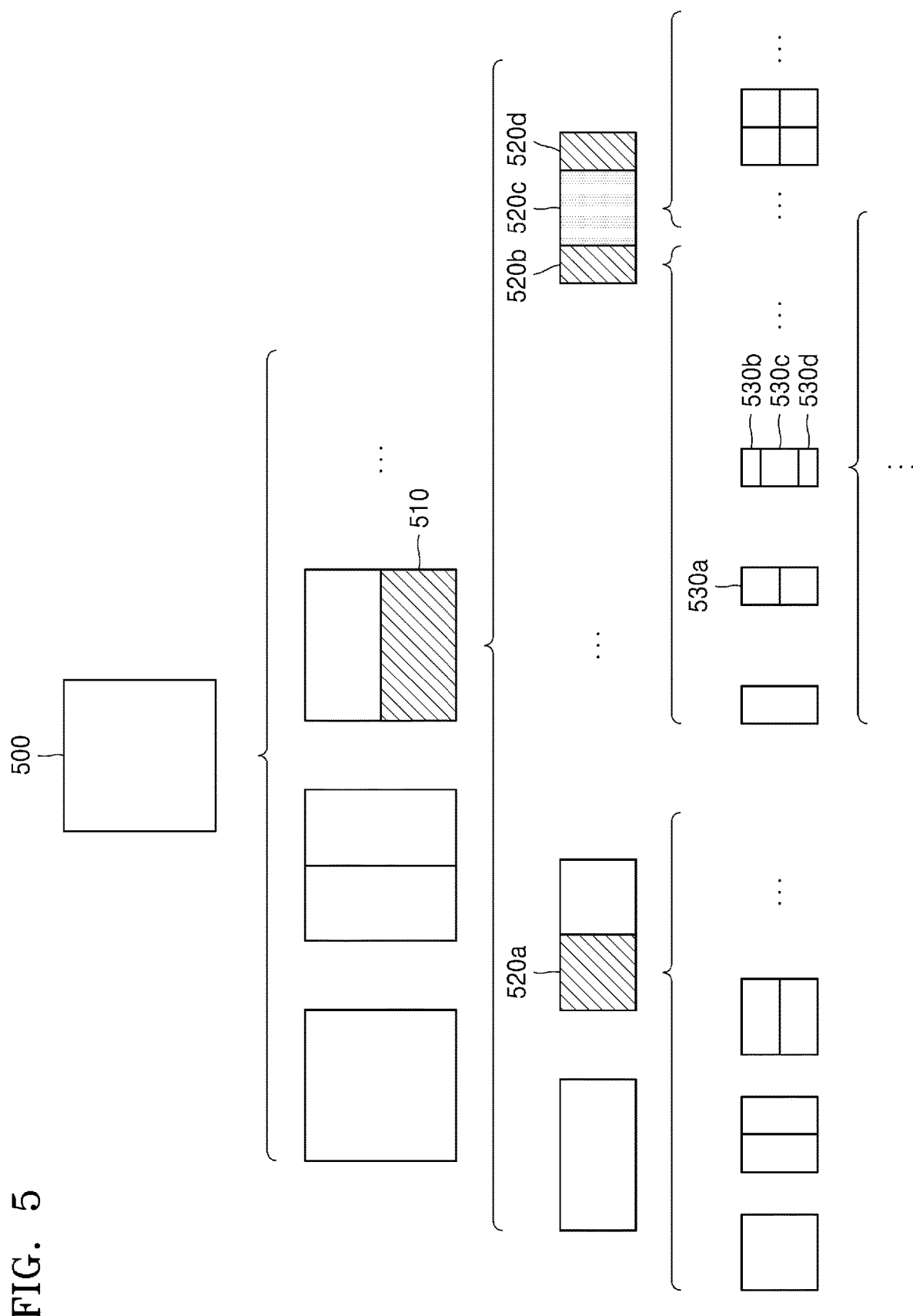
FIG. 5 illustrates a process, performed by an image decoding apparatus, of splitting a coding unit based on at least one of block shape information and split shape mode information, according to an embodiment.

FIG. 5 illustrates a process, performed by an image decoding apparatus, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520*a*, or 520*b*, 520*c*, and 520*d* based on the split shape mode information. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520*a*, or 520*b*, 520*c*, and 520*d* based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a certain coding unit from among the odd number of third coding units 520*b*, 520*c*, and 520*d* determined by splitting the non-square second coding unit 510 (e.g., a coding unit at a center location or a square coding unit) may be recursively split. According to an embodiment, the square third coding unit 520*c* from among the odd number of third coding units 520*b*, 520*c*, and 520*d* may be split in a horizontal direction into a plurality of fourth coding units. A non-square fourth coding unit 530*b* or 530*d* from among a plurality of fourth coding units 530*a*, 530*b*, 530*c*, and 530*d* may be split into a plurality of coding units again. For example, the non-square fourth coding unit 530*b* or 530*d* may be split into the odd number of coding units again. A method that may be used to recursively split a coding unit will be described below in relation to various embodiments.

According to an embodiment, the image decoding apparatus 100 may split each of the third coding units 520*a*, or 520*b*, 520*c*, and 520*d* into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520*b*, 520*c*, and 520*d*. The image decoding apparatus 100 may put a certain restriction on a certain third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment, the image decoding apparatus 100 may obtain the split shape mode information, which is used to split a current coding unit, from a certain location in the current coding unit.

Figure 6:
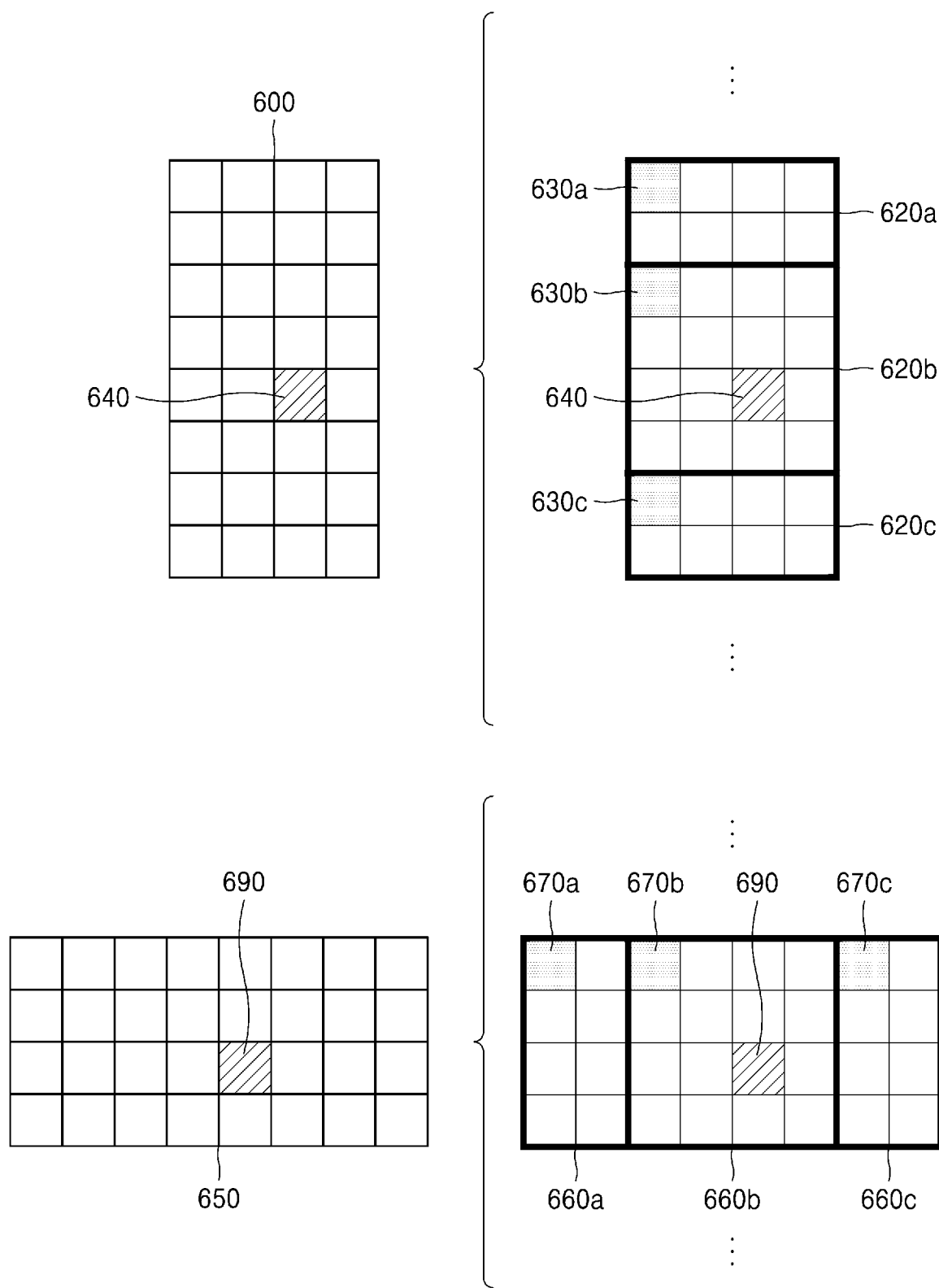
FIG. 6 illustrates a method, performed by an image decoding apparatus, of determining a certain coding unit from among an odd number of coding units, according to an embodiment.

FIG. 6 illustrates a method, performed by an image decoding apparatus, of determining a certain coding unit from among an odd number of coding units, according to an embodiment.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the certain location and may determine to split or not to split the current coding unit into various-shaped and various-sized coding units.

According to an embodiment, when the current coding unit is split into a certain number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a certain location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620*a*, 620*b*, and 620*c* or the odd number of coding units 660*a*, 660*b*, and 660*c* by splitting the current coding unit 600 or the current coding unit 650. The image decoding apparatus 100 may determine the middle coding unit 620*b* or the middle coding unit 660*b* by using information about the locations of the odd number of coding units 620*a*, 620*b*, and 620*c* or the odd number of coding units 660*a*, 660*b*, and 660*c*. For example, the image decoding apparatus 100 may determine the coding unit 620*b* of the center location by determining the locations of the coding units 620*a*, 620*b*, and 620*c* based on information indicating locations of certain samples included in the coding units 620*a*, 620*b*, and 620*c*. In detail, the image decoding apparatus 100 may determine the coding unit 620*b* at the center location by determining the locations of the coding units 620*a*, 620*b*, and 620*c* based on information indicating locations of upper left samples 630*a*, 630*b*, and 630*c* of the coding units 620*a*, 620*b*, and 620*c*.

According to an embodiment, the information indicating the locations of the upper left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an embodiment, the information indicating the locations of the upper left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment, information indicating the location of the upper left sample 630*a* of the upper coding unit 620*a* may include coordinates (xa, ya), information indicating the location of the upper left sample 630*b* of the middle coding unit 620*b* may include coordinates (xb, yb), and information indicating the location of the upper left sample 630*c* of the lower coding unit 620*c* may include coordinates (xc, yc). The image decoding apparatus 100 may determine the middle coding unit 620*b* by using the coordinates of the upper left samples 630*a*, 630*b*, and 630*c* which are included in the coding units 620*a*, 620*b*, and 620*c*, respectively. For example, when the coordinates of the upper left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the upper left samples 630*a*, 630*b*, and 630*c* may include coordinates indicating absolute locations in the picture, or may use coordinates (dxb, dyb) indicating a relative location of the upper left sample 630*b* of the middle coding unit 620*b* and coordinates (dxc, dyc) indicating a relative location of the upper left sample 630*c* of the lower coding unit 620*c* with reference to the location of the upper left sample 630*a* of the upper coding unit 620*a*. A method of determining a coding unit at a certain location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620*a*, 620*b*, and 620*c*, and may select one of the coding units 620*a*, 620*b*, and 620*c* based on a certain criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper left sample 630a of the upper coding unit 620a, the coordinates (xb, yb) that is the information indicating the location of the upper left sample 630b of the middle coding unit 620b, and the coordinates (xc, yc) that is the information indicating the location of the upper left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the certain location. However, the above-described method, performed by the image decoding apparatus 100, of determining a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

The image decoding apparatus 100 may determine the width or height of each of the coding units 660a, 660b, and 660c by using the coordinates (xd, yd) that is information indicating the location of a upper left sample 670a of the left coding unit 660a, the coordinates (xe, ye) that is information indicating the location of a upper left sample 670b of the middle coding unit 660b, and the coordinates (xf, yf) that is information indicating a location of the upper left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe.

The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a to 660c. Referring to FIG. 6, the image decoding apparatus 100 may determine the middle coding unit 660b, which has a size different from the sizes of the left and right coding units 660a and 660c, as the coding unit of the certain location. However, the above-described method, performed by the image decoding apparatus 100, of determining a coding unit having a size different from the size of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a certain location from among an odd number of coding units determined by splitting the current coding unit, considering the shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the certain location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the certain location from among the even number of coding units. The image decoding apparatus 100 may determine an even number of coding units by splitting (binary-splitting) the current coding unit, and may determine the coding unit at the certain location by using the information about the locations of the even number of coding units. An operation related thereto may correspond to the operation of determining a coding unit at a certain location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, certain information about a coding unit at a certain location may be used in a splitting operation to determine the coding unit at the certain location from among the plurality of coding units.

For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units). That is, the image decoding apparatus 100 may determine the sample at the certain location by considering a block shape of the current coding unit 600, determine the coding unit 620b including a sample, from which certain information (e.g., the split shape mode information) may be obtained, from among the plurality of coding units 620a, 620b, and 620c determined by splitting the current coding unit 600, and may put a certain restriction on the coding unit 620b. Referring to FIG. 6, according to an embodiment, the image decoding apparatus 100 may determine the sample 640 at the center location of the current coding unit 600 as the sample from which the certain information may be obtained, and may put a certain restriction on the coding unit 620b including the sample 640, in a decoding operation. However, the location of the sample from which the certain information may be obtained is not limited to the above-described location, and may include arbitrary locations of samples included in the coding unit 620b to be determined for a restriction.

According to an embodiment, the location of the sample from which the certain information may be obtained may be determined based on the shape of the current coding unit 600. According to an embodiment, the block shape information may indicate whether the current coding unit has a square or non-square shape, and the location of the sample from which the certain information may be obtained may be determined based on the shape. For example, the image decoding apparatus 100 may determine a sample located on a boundary for splitting at least one of a width and height of the current coding unit in half, as the sample from which the certain information may be obtained, by using at least one of information about the width of the current coding unit and information about the height of the current coding unit. As another example, when the block shape information of the current coding unit indicates a non-square shape, the image decoding apparatus 100 may determine one of samples including a boundary for splitting a long side of the current coding unit in half, as the sample from which the predetermined information may be obtained.

According to an embodiment, when the current coding unit is split into a plurality of coding units, the image decoding apparatus 100 may use the split shape mode information to determine a coding unit at a certain location from among the plurality of coding units. According to an embodiment, the image decoding apparatus 100 may obtain the split shape mode information from a sample at a certain location in a coding unit, and split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a certain block (e.g., the current coding unit).

Figure 7:
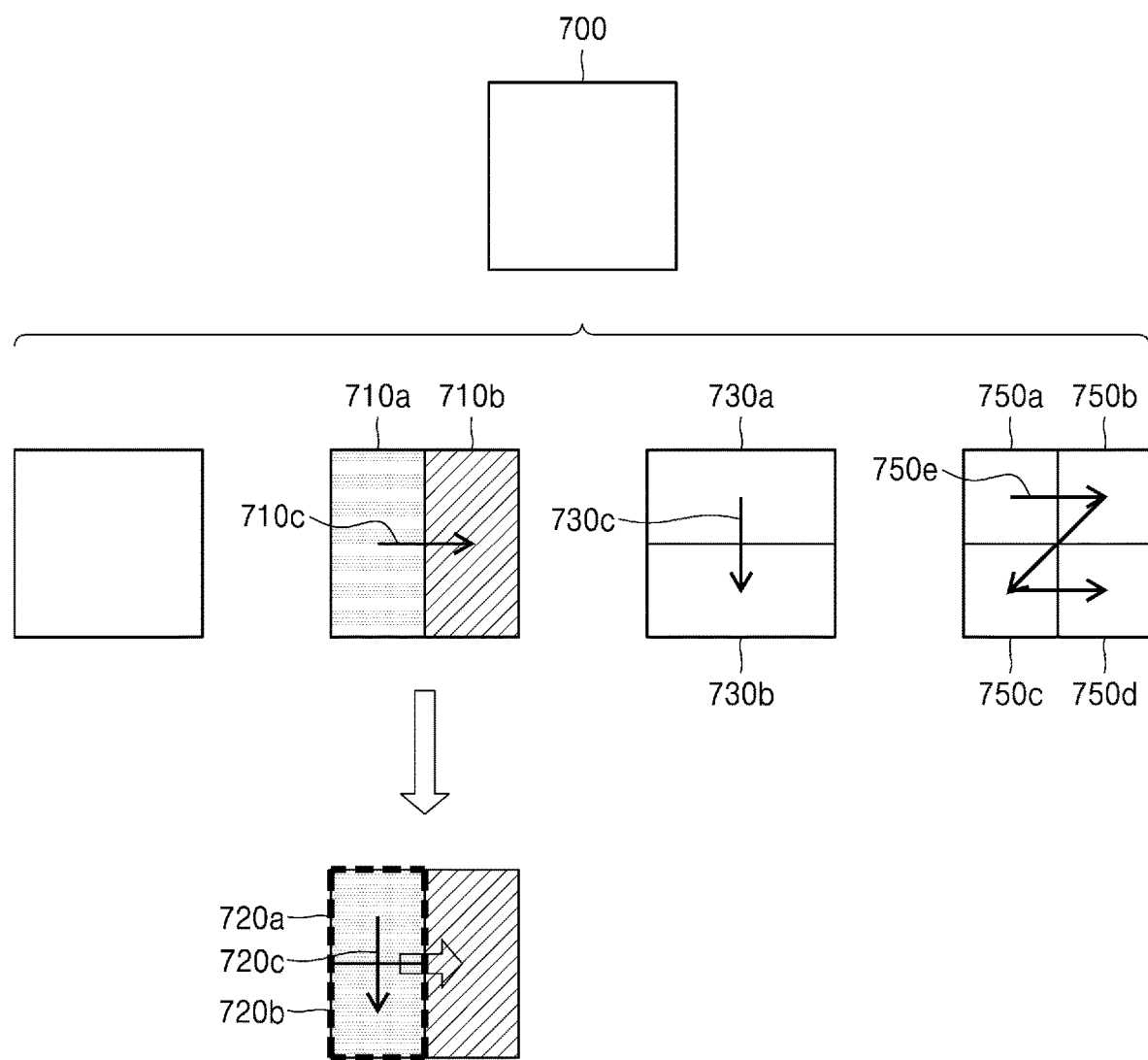
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when an image decoding apparatus determines the plurality of coding units by splitting a current coding unit, according to an embodiment.

According to an embodiment, the image decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, in a certain order for processing coding units in a row and then processing coding units in a next row (e.g., in a raster scan order or Z-scan order 750e).

According to an embodiment, the image decoding apparatus 100 may recursively split coding units. Referring to FIG. 7, the image decoding apparatus 100 may determine the plurality of coding units 710a and 710b, 730a and 730b, or 750a to 750d by splitting the first coding unit 700, and recursively split each of the determined plurality of coding units 710b, 730a and 730b, or 750a to 750d. A splitting method of the plurality of coding units 710b, 730a and 730b, or 750a to 750d may correspond to a splitting method of the first coding unit 700. As such, each of the plurality of coding units 710b, 730a and 730b, or 750a to 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a certain order.

Figure 8:
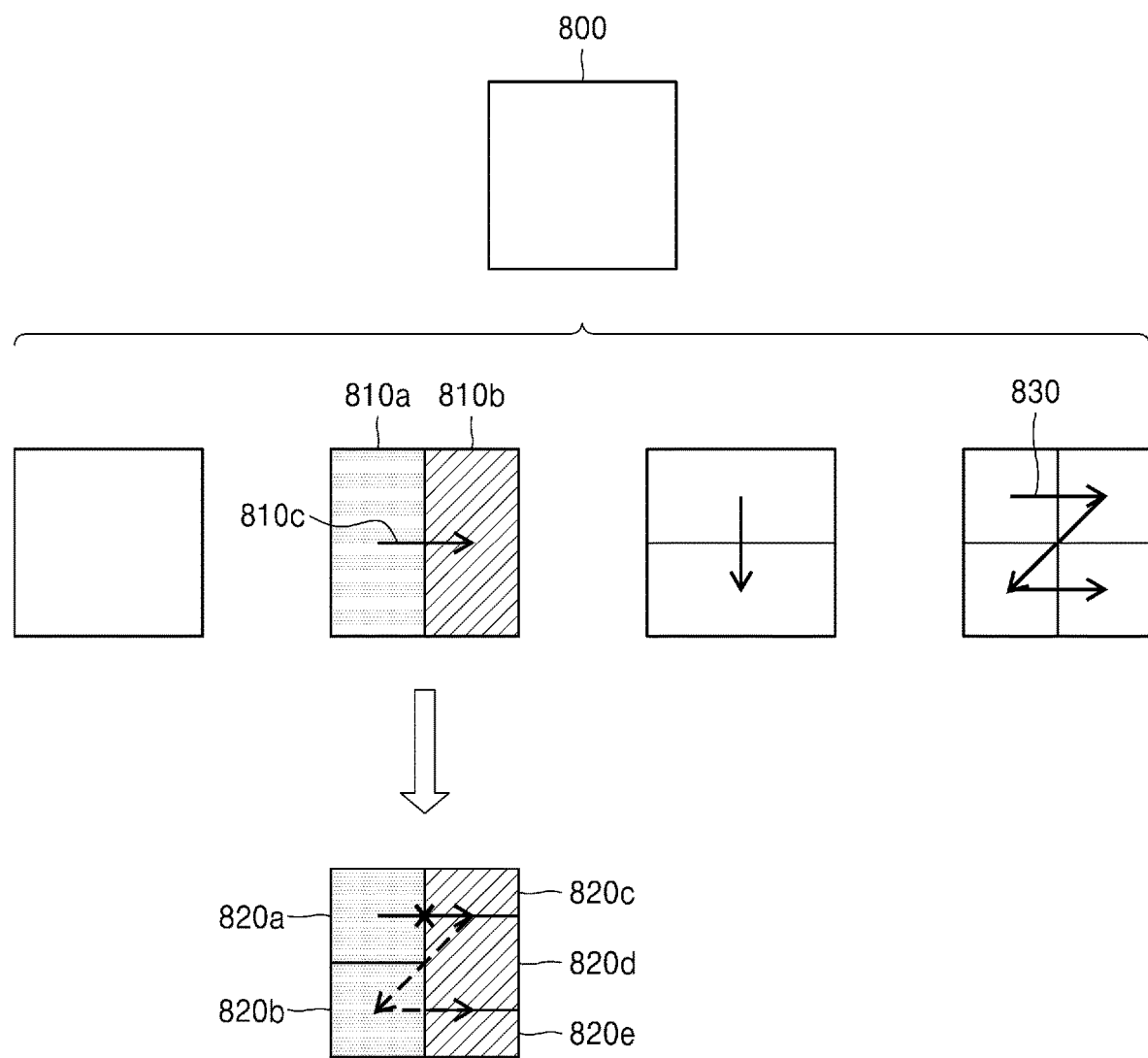
FIG. 8 illustrates a process, performed by an image decoding apparatus, of determining that a current coding unit is to be split into an odd number of coding units, when the coding units are not processable in a certain order, according to an embodiment.

FIG. 8 illustrates a process, performed by an image decoding apparatus, of determining that a current coding unit is to be split into an odd number of coding units, when the coding units are not processable in a certain order, according to an embodiment.

According to an embodiment, the image decoding apparatus 100 may determine whether the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a certain order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c to 820e are split into an odd number of coding units, based on at least one of the block shape information and the split shape mode information. For example, the right second coding unit 810b among the second coding units 810a and 810b may be split into an odd number of third coding units 820c, 820d, and 820e. A processing order of a plurality of coding units included in the first coding unit 800 may be a certain order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the certain order.

According to an embodiment, the image decoding apparatus 100 may determine whether the third coding units 820a and 820b, and 820c to 820e included in the first coding unit 800 satisfy the condition for processing in the certain order, and the condition relates to whether at least one of a width and height of the second coding units 810a and 810b is split in half along a boundary of the third coding units 820a and 820b, and 820c to 820e. For example, the third coding units 820a and 820b determined when the height of the left second coding unit 810a of the non-square shape is split in half may satisfy the condition. It may be determined that the third coding units 820c to 820e do not satisfy the condition because the boundaries of the third coding units 820c to 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is split into an odd number of coding units, based on a result of the determination. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof will not be provided herein.

Figure 9:
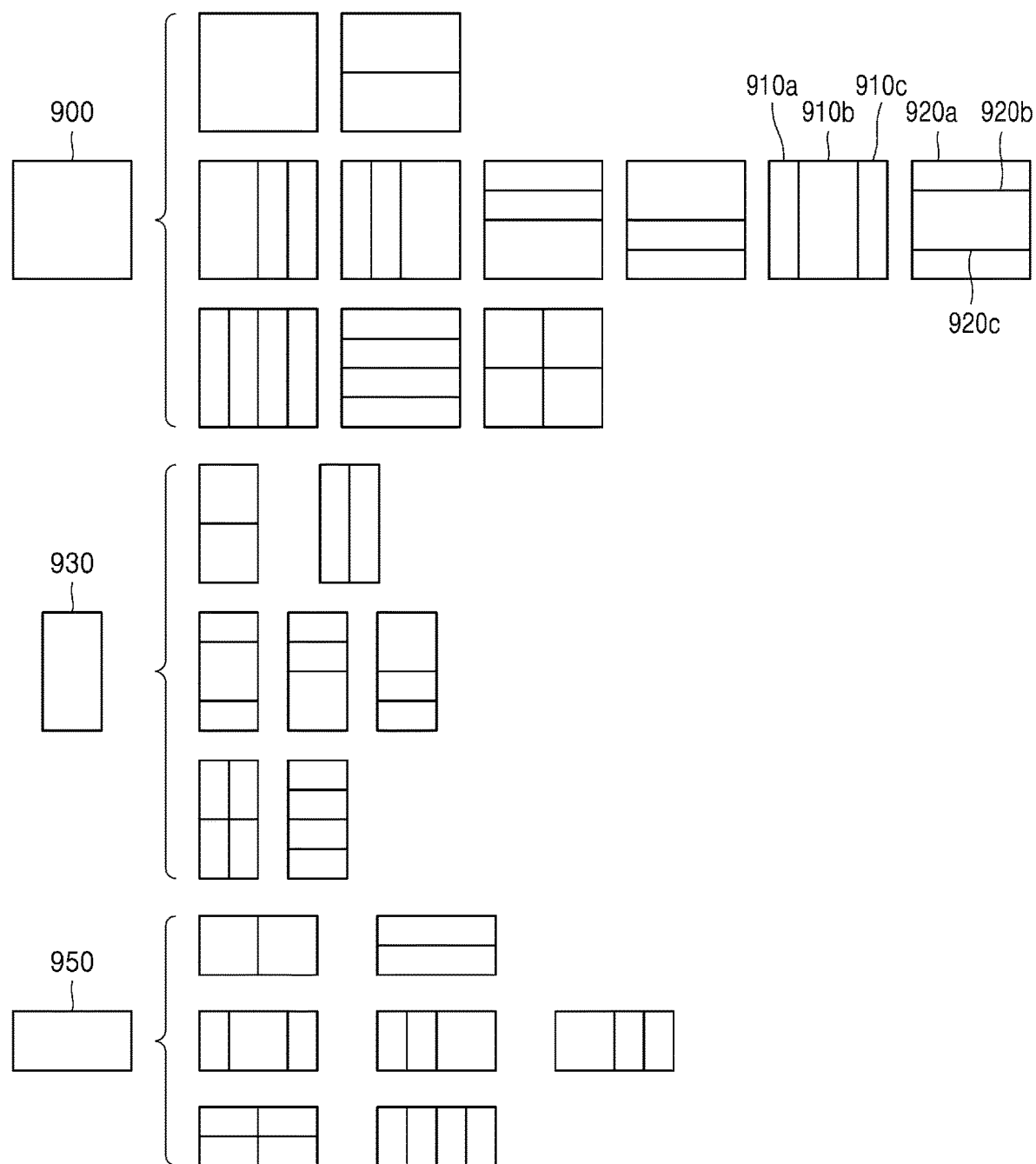
FIG. 9 illustrates a process, performed by an image decoding apparatus, of determining at least one coding unit by splitting a first coding unit, according to an embodiment.

FIG. 9 illustrates a process, performed by an image decoding apparatus, of determining at least one coding unit by splitting a first coding unit, according to an embodiment.

According to an embodiment, the image decoding apparatus 100 may split the first coding unit 900, based on split shape mode information, which is obtained through the receiver 110. The square first coding unit 900 may be split into four square coding units, or may be split into a plurality of non-square coding units. For example, referring to FIG. 9, when the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a certain order, and the condition relates to whether at least one of a width and height of the first coding unit 900 is split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the certain order. In addition, because boundaries of the second coding units 920a, 920b, and 920c determined by splitting the square first coding unit 900 in a horizontal direction do not split the width of the first coding unit 900 in half, it may be determined that the first coding unit 900 does not satisfy the condition for processing in the certain order. When the condition is not satisfied as described above, the image decoding apparatus 100 may decide disconnection of a scan order, and may determine that the first coding unit 900 is split into an odd number of coding units, based on a result of the decision. According to an embodiment, when a coding unit is split into an odd number of coding units, the image decoding apparatus 100 may put a certain restriction on a coding unit at a certain location from among the split coding units. The restriction or the certain location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
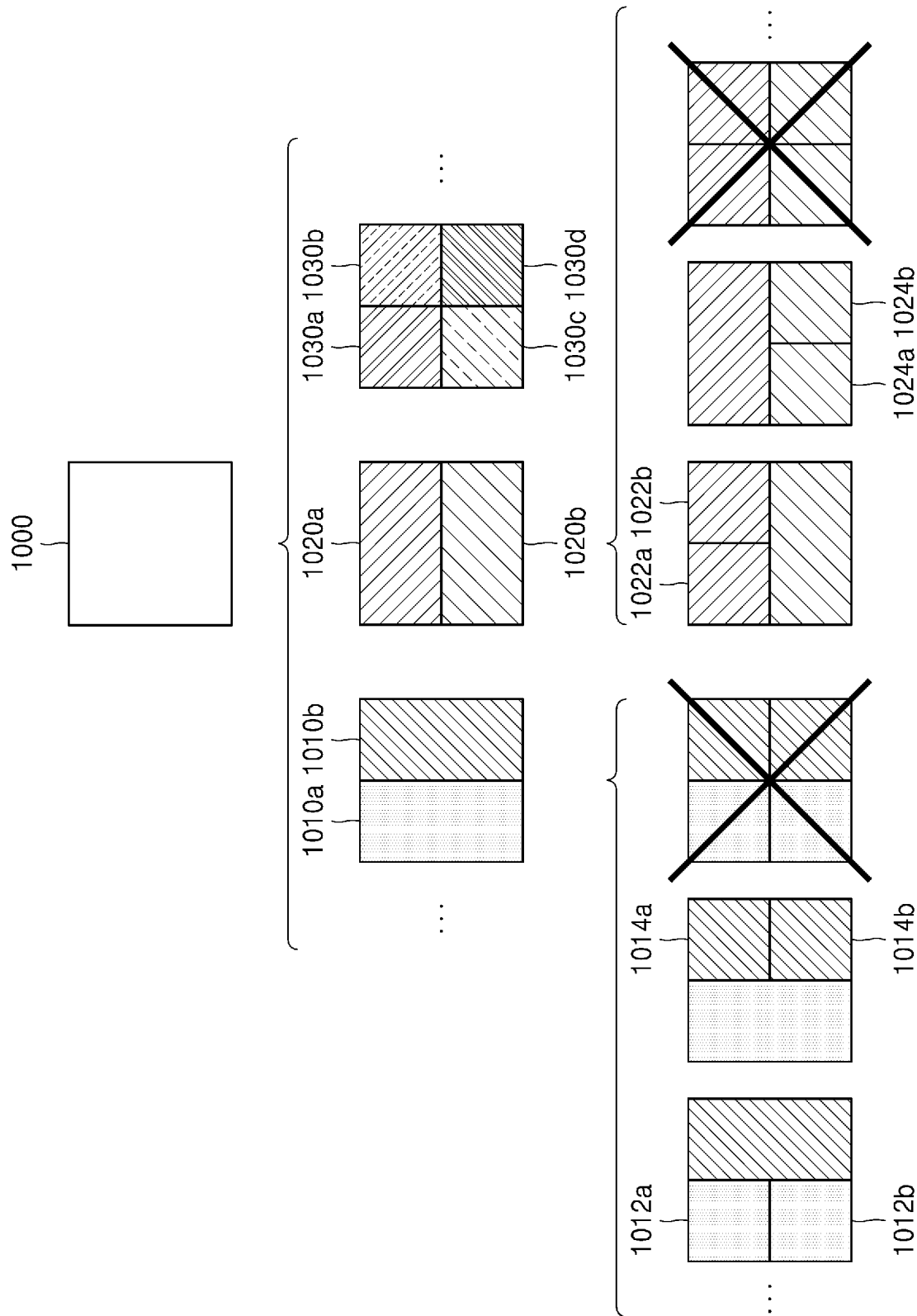
FIG. 10 illustrates that a shape into which a second coding unit is splittable is restricted when the second coding unit having a non-square shape, which is determined when an image decoding apparatus splits a first coding unit, satisfies a certain condition, according to an embodiment.

FIG. 10 illustrates that a shape into which a second coding unit is splittable is restricted when the second coding unit having a non-square shape, which is determined when an image decoding apparatus splits a first coding unit, satisfies a certain condition, according to an embodiment.

According to an embodiment, the image decoding apparatus 100 may determine to split the square first coding unit 1000 into non-square second coding units 1010a, and 1010b or 1020a and 1020b, based on split shape mode information, which is obtained by the receiver 110. The second coding units 1010a and 1010b or 1020a and 1020b may be independently split. As such, the image decoding apparatus 100 may determine to split or not to split each of the second coding units 1010a and 1010b or 1020a and 1020b into a plurality of coding units, based on the split shape mode information of each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
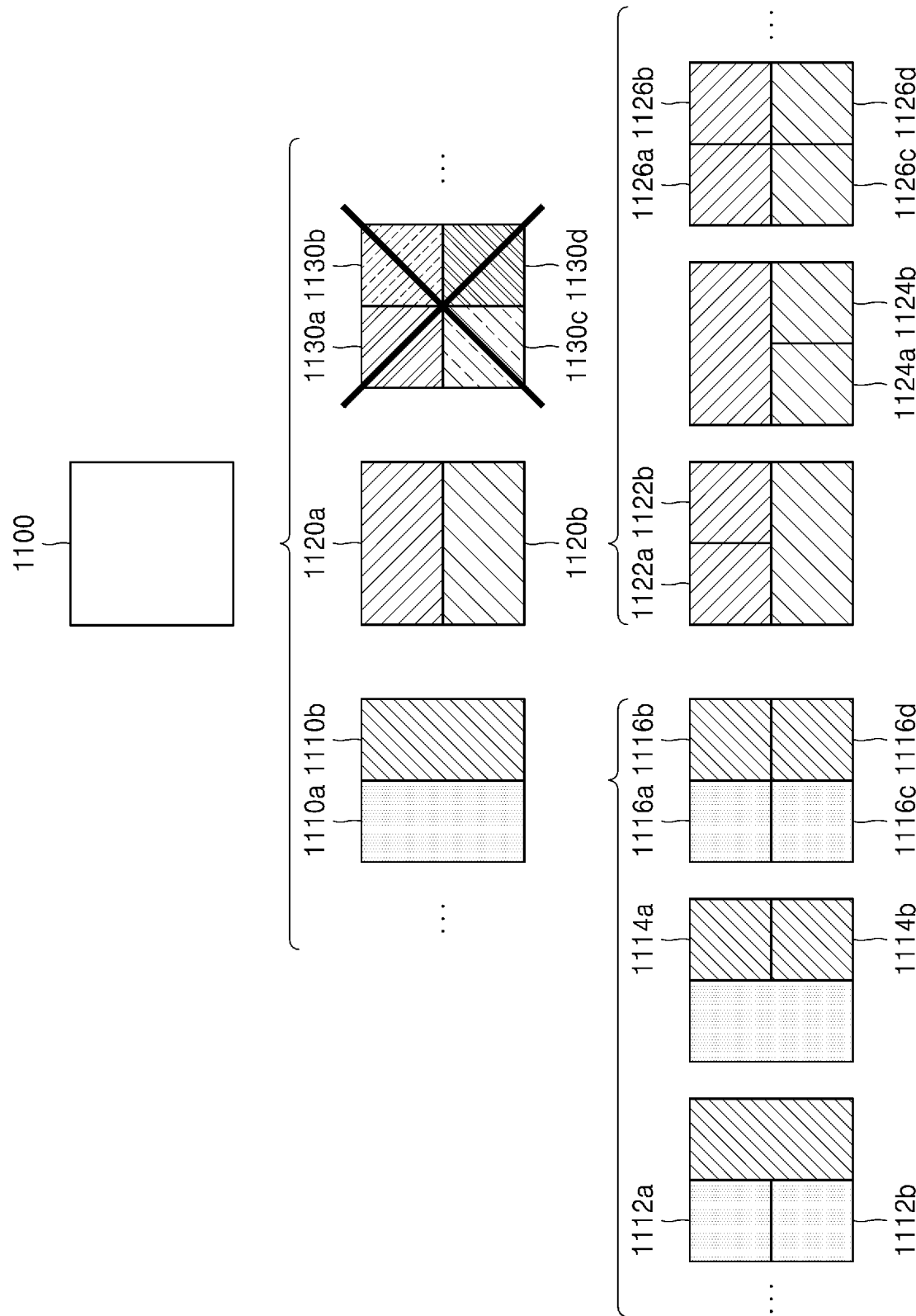
FIG. 11 illustrates a process, performed by an image decoding apparatus, of splitting a square coding unit when split shape mode information is unable to indicate that the square coding unit is split into four square coding units, according to an embodiment.

FIG. 11 illustrates a process, performed by an image decoding apparatus, of splitting a square coding unit when split shape mode information is unable to indicate that the square coding unit is split into four square coding units, according to an embodiment.

According to an embodiment, the image decoding apparatus 100 may determine second coding units 1110a and 1110b or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a certain order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
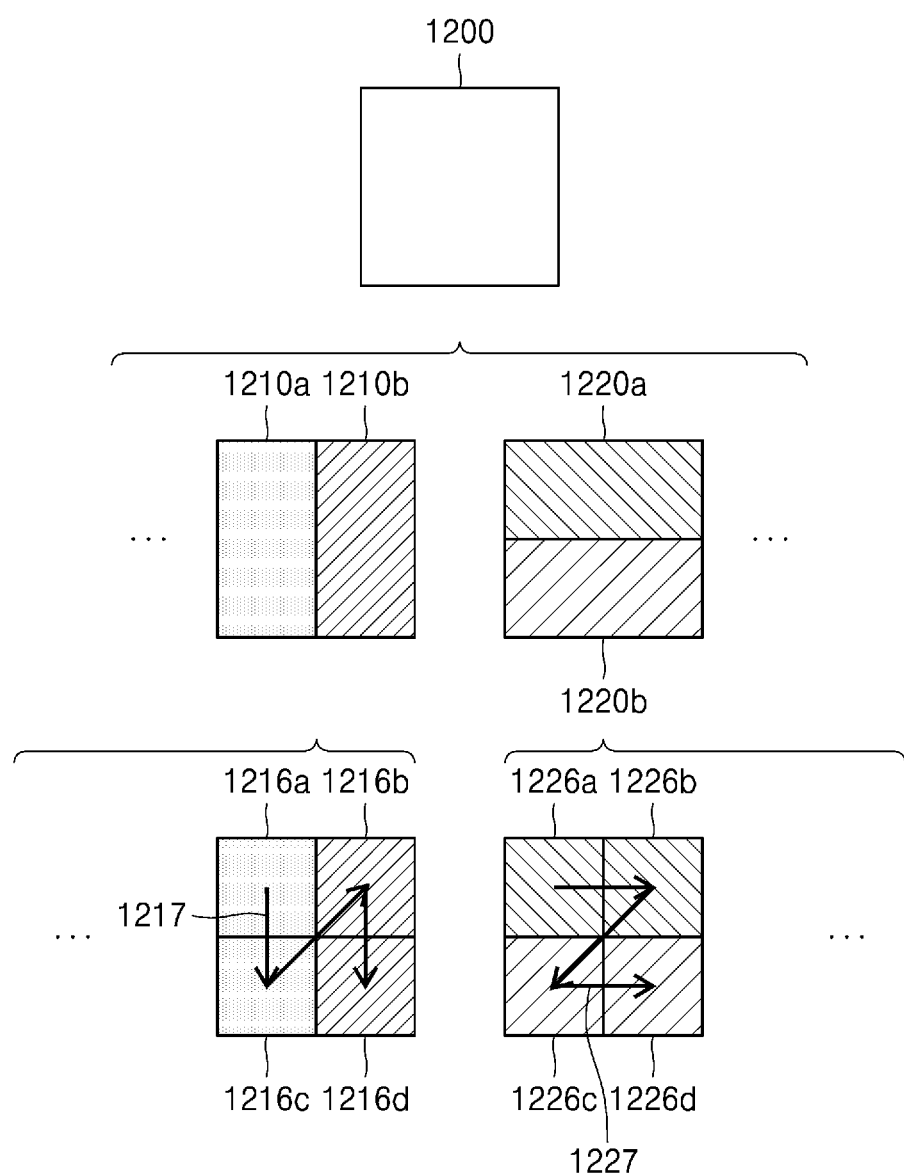
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210a and 1210b or 1220a and 1220b, etc. by splitting the first coding unit 1200. Referring to FIG. 12, the non-square second coding units 1210a and 1210b or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b or 1220a and 1220b has been described above in relation to FIG. 11, and thus detailed descriptions thereof will not be provided herein.

According to an embodiment, the image decoding apparatus 100 may process coding units in a certain order. An operation of processing coding units in a certain order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1920b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape information, the image decoding apparatus 100 may process a plurality of coding units in different orders even when the coding units are eventually determined to be the same shape.

FIG. 13 illustrates a process of determining a depth of a coding unit when a shape and size of the coding unit change, when the coding unit is recursively split such that a plurality of coding units are determined, according to an embodiment.

According to an embodiment, the image decoding apparatus 100 may determine the depth of the coding unit, based on a certain criterion. For example, the certain criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
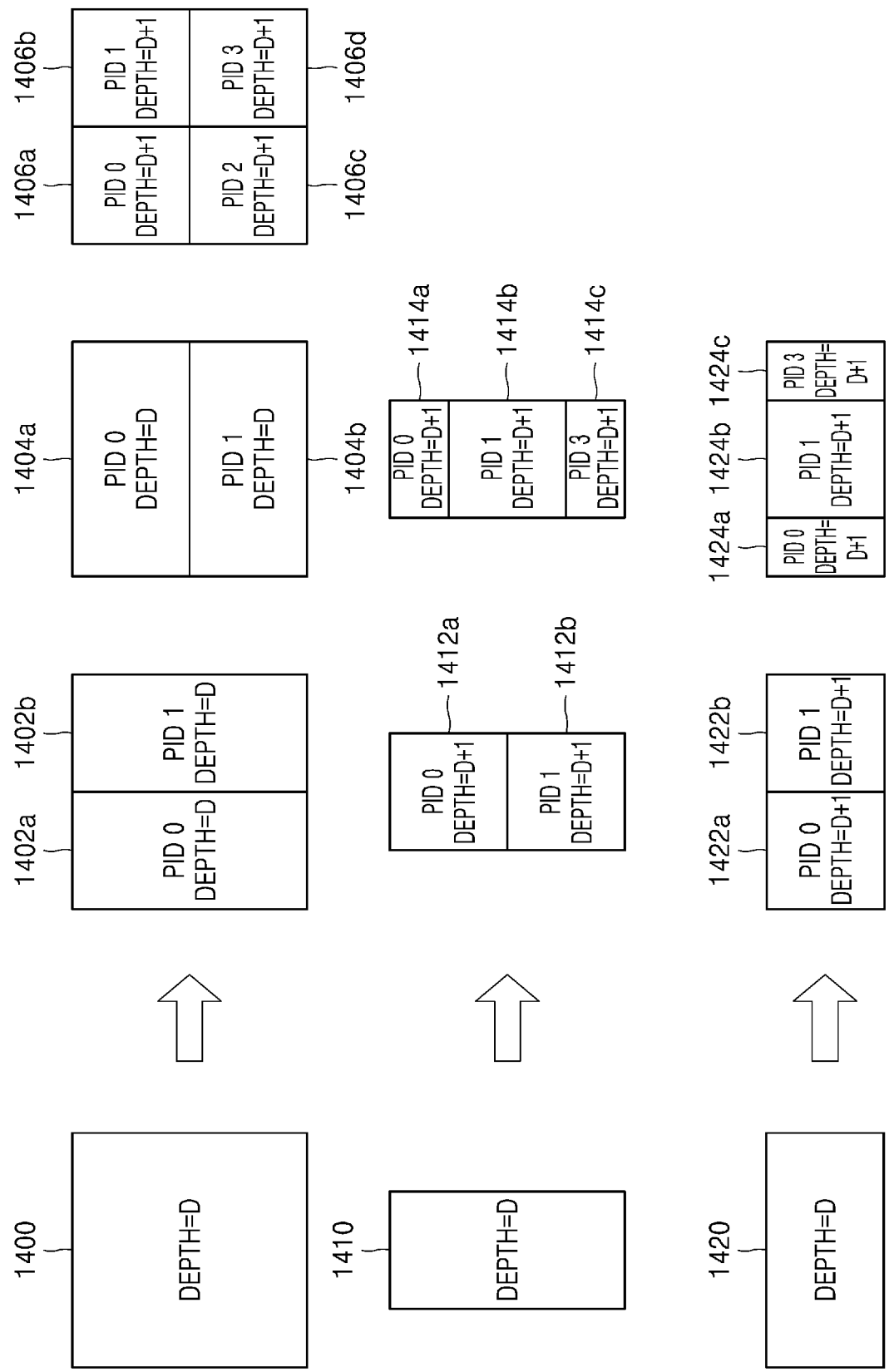
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 2100 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the first coding unit 1410, a depth of the second coding units 1414*a*, 1414*b*, and 1414*c* may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414*b* of a center location among an odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs to identify respective coding units. According to an embodiment, the PID may be obtained from a sample of a certain location of each coding unit (e.g., an upper left sample).

According to an embodiment, the image decoding apparatus 100 may determine a coding unit at a certain location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a certain location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the certain location are not limited to the above-described examples, and various PIDs and various locations and sizes of coding units may be used.

According to an embodiment, the image decoding apparatus 100 may use a certain data unit where a coding unit starts to be recursively split.

Figure 15:
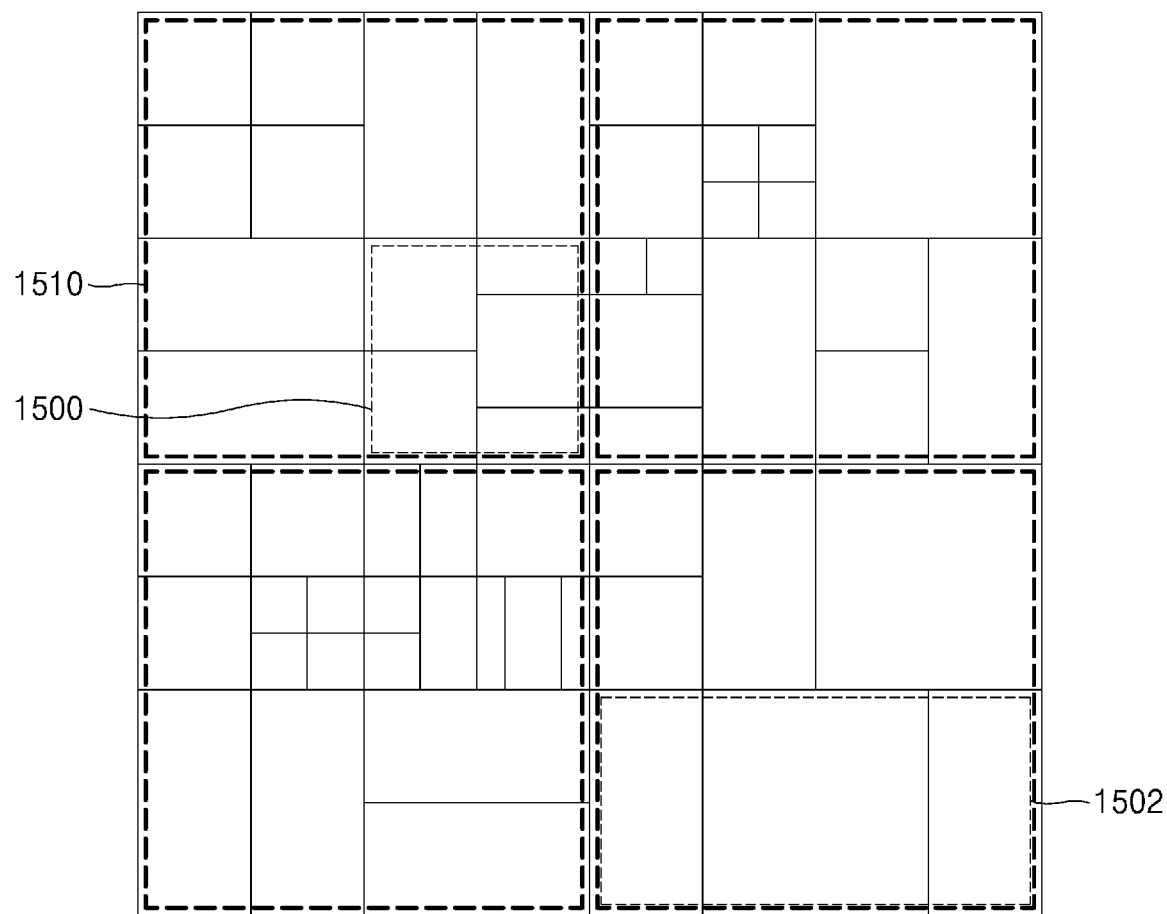
FIG. 15 illustrates that a plurality of coding units are determined based on a plurality of certain data units included in a picture, according to an embodiment.

FIG. 15 illustrates that a plurality of coding units are determined based on a plurality of certain data units included in a picture, according to an embodiment.

According to an embodiment, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain size shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a certain condition. That is, the receiver 110 may obtain, from the bitstream, only the PID for identifying the size and shape of reference coding units with respect to each slice, slice segment, tile, tile group, or largest coding unit which is a data unit satisfying a certain condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the certain condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the present disclosure will be described in detail.

The image decoding apparatus 100 may determine a split rule of an image. The split rule may be pre-determined between the image decoding apparatus 100 and the image encoding apparatus 2200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, or a tile group header. The image decoding apparatus 100 may determine the split rule differently according to frames, slices, tiles, temporal layers, largest coding units, or coding units.

The image decoding apparatus 100 may determine the split rule based on block shape information of a coding unit. A block shape may include a size, shape, a ratio of width and height, and a direction of the coding unit. The image decoding apparatus 100 may pre-determine to determine the split rule based on block shape information of a coding unit. However, an embodiment is not limited thereto. The image decoding apparatus 100 may determine the split rule of the image, based on information obtained from a received bitstream.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined in the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding process orders. Because the decoding process orders have been described above with reference to FIG. 12, details thereof are not provided again.

Figure 16:
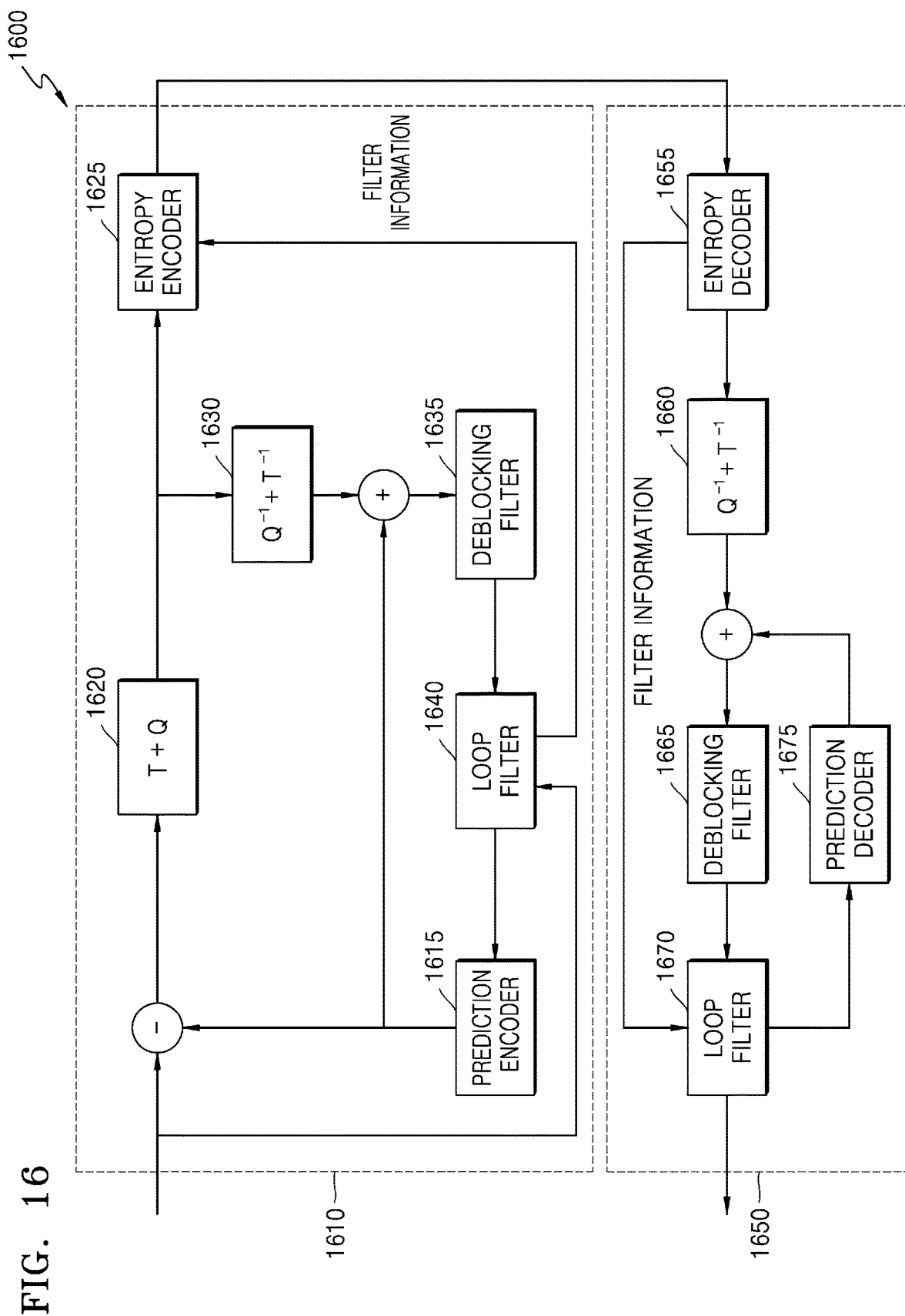
FIG. 16 is a block diagram of an image encoding and decoding system.

FIG. 16 is a block diagram of an image encoding and decoding system.

An encoding end 1610 of an image encoding and decoding system 1600 transmits an encoded bitstream of an image and a decoding end 1650 outputs a reconstructed image by receiving and decoding the bitstream. Here, the decoding end 1550 may have a similar configuration as the image decoding apparatus 100.

At the encoding end 1610, a prediction encoder 1615 outputs a reference image via inter-prediction and intra-prediction, and a transformer and quantizer 1620 quantizes residual data between the reference picture and a current input image to a quantized transform coefficient and outputs the quantized transform coefficient. An entropy encoder 1625 transforms the quantized transform coefficient by encoding the quantized transform coefficient, and outputs the transformed quantized transform coefficient as a bitstream. The quantized transform coefficient is reconstructed as data of a spatial domain via an inverse quantizer and inverse transformer 1630, and the data of the spatial domain is output as a reconstructed image via a deblocking filter 1635 and a loop filter 1640. The reconstructed image may be used as a reference image of a next input image via the prediction encoder 1615.

Encoded image data among the bitstream received by the decoding end 1650 is reconstructed as residual data of a spatial domain via an entropy decoder 1655 and an inverse quantizer and inverse transformer 1660. Image data of a spatial domain is configured when a reference image and residual data output from a prediction decoder 1675 are combined, and a deblocking filter 1665 and a loop filter 1670 may output a reconstructed image regarding a current original image by performing filtering on the image data of the spatial domain. The reconstructed image may be used by the prediction decoder 1675 as a reference image for a next original image.

The loop filter 1640 of the encoding end 1610 performs loop filtering by using filter information input according to a user input or system setting. The filter information used by the loop filter 1640 is output to the entropy encoder 1625 and transmitted to the decoding end 1650 together with the encoded image data. The loop filter 1670 of the decoding end 1650 may perform loop filtering based on the filter information input from the decoding end 1650.

Hereinafter, a method and apparatus for encoding or decoding a video by expanding an inter-prediction method by using a probability motion expression method, according to an embodiment of the present disclosure will be described with reference to FIGS. 17 through 20.

Figure 17:
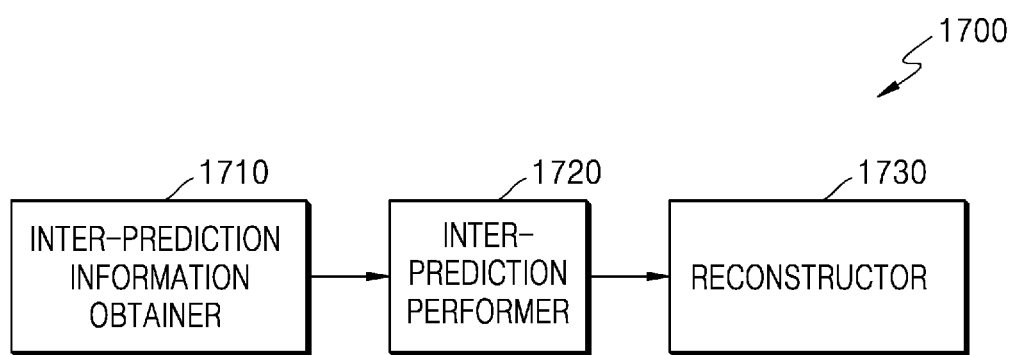
FIG. 17 is a detailed block diagram of a video decoding apparatus according to an embodiment.

FIG. 17 is a detailed block diagram of a video decoding apparatus according to an embodiment.

Referring to FIG. 17, a video decoding apparatus 1700 according to an embodiment may include an inter-prediction information obtainer 1710, an inter-prediction performer 1720, and a reconstructor 1730.

The video decoding apparatus 1700 may obtain a bitstream generated as a result of encoding an image and decode motion information for inter-prediction based on information included in the bitstream.

The video decoding apparatus 1700 according to an embodiment may include a central processor (not shown) for controlling the inter-prediction information obtainer 1710, the inter-prediction performer 1720, and the reconstructor 1730. Alternatively, the inter-prediction information obtainer 1710, the inter-prediction performer 1720, and the reconstructor 1730 may operate by their own processors (not shown), and the processors may systematically operate with each other to operate the video decoding apparatus 1700. Alternatively, the inter-prediction information obtainer 1710, the inter-prediction performer 1720, and the reconstructor 1730 may be controlled according to control of an external processor (not shown) of the video decoding apparatus 1700.

The video decoding apparatus 1700 may include one or more data storages (not shown) storing input/output data of the inter-prediction information obtainer 1710, the inter-prediction performer 1720, and the reconstructor 1730. The video decoding apparatus 1700 may include a memory controller (not shown) for controlling data input and output of the data storage.

The video decoding apparatus 1700 may perform an image decoding operation including prediction by connectively operating with an internal video decoding processor or an external video decoding processor so as to reconstruct an image via image decoding. The internal video decoding processor of the video decoding apparatus 1700 according to an embodiment may perform a basic image decoding operation in a manner that not only a separate processor but also an image decoding processing module included in a central processing apparatus or a graphic processing apparatus perform the basic image decoding operation.

The video decoding apparatus 1700 may be included in the image decoding apparatus 100 described above. For example, the inter-prediction information obtainer 1710 may be included in the receiver 110 of the image decoding apparatus 100 of FIG. 1, and the inter-prediction performer 1720 and reconstructor 1730 may be included in the decoder 120 of the image decoding apparatus 100.

The inter-prediction information obtainer 1710 receives a bitstream generated as a result of encoding an image. The bitstream may include information for determining a motion vector used for inter-prediction of a current block. The current block is a block generated when an image is split according to a tree structure, and for example, may correspond to a largest coding unit, a coding unit, or a transform unit.

The inter-prediction information obtainer 1710 may determine the current block based on block shape information and/or information about a split shape mode, which are included in at least one of a sequence parameter set, a picture parameter set, a video parameter set, a slice header, and a slice segment header. Furthermore, the inter-prediction information obtainer 1710 may obtain, from the bitstream, a syntax element corresponding to the block shape information or the information about the split shape mode according to each largest coding unit, each reference coding unit, or each processing block, and may use the obtained syntax element to determine the current block.

The bitstream may include information indicating a prediction mode of the current block, and the prediction mode of the current block may include at least one of an intra mode, an inter mode, a merge mode, a skip mode, and a merge motion vector difference mode according to the present disclosure. The merge motion vector difference mode may be a mode of determining a prediction motion vector of the current block by applying a motion vector difference distinguished according to a differential distance and a differential direction, to one base motion vector determined from among merge motion vector candidates.

According to an embodiment, information related to the merge motion vector difference mode may be obtained from the bitstream. The information related to the merge motion vector difference mode according to an embodiment may include at least one of information indicating whether the merge motion vector difference mode is applied to the current block (hereinafter, merge difference mode information), information indicating the base motion vector of the current block (hereinafter, merge candidate information), information indicating the differential distance from the base motion vector to motion vector candidates (hereinafter, differential distance index), and information indicating the differential direction from the base motion vector to the motion vector candidates (hereinafter, differential direction index).

The inter-prediction information obtainer 1710 may obtain the information related to the merge motion vector difference mode from a level corresponding to at least one unit from among a coding unit, a transform unit, a largest coding unit, a slice unit, and a picture unit.

The inter-prediction performer 1720 determines the motion vector of the current block based on information included in the bitstream.

The inter-prediction performer 1720 may verify whether the merge motion vector difference mode is applied to the current block, based on the information included in the bitstream. The information indicating whether the merge motion vector difference mode is applied may include a flag or an index.

According to an embodiment, the inter-prediction information obtainer 1710 may extract, from the bitstream, information indicating whether the merge motion vector difference mode is applied, when a skip mode or a merge mode is applied to the current block.

When the merge motion vector difference mode is applied to the current block, the motion vector candidates may be set according to variable differential distance and differential direction from the base motion vector.

The differential distance is a value determined based on a base pixel unit (for example, a ¼ pixel unit) and may indicate a difference by base pixel units. For example, when the differential distance between the base motion vector and the motion vector is 1, the motion vector and the base motion vector are different by a pixel distance corresponding to one ¼ pixel unit. The differential distance may have a value corresponding to an integer, a rational number, or an irrational number.

When a smallest pixel unit capable of being indicated by the motion vector of the current block is the same as the base pixel unit, the inter-prediction performer 1720 may determine motion vectors according to a pre-determined differential distance.

However, when the smallest pixel unit capable of being indicated by the motion vector of the current block is different from the base pixel unit, the inter-prediction performer 1720 may scale the pre-determined differential distance and then determine the motion vector candidate for the base motion vector, based on the scaled differential distance.

When the motion vector of the current block is capable of indicating pixels corresponding to an integer pixel unit, a ½ pixel unit, a ¼ pixel unit, and a ⅛ pixel unit, the smallest pixel unit capable of being indicated by the motion vector of the current block is ⅛ pixel unit. Also, when the base pixel unit is a ¼ pixel unit, the inter-prediction performer 1720 may up-scale the differential distance for determining the motion vector.

According to an embodiment, the inter-prediction performer 1720 may scale the differential distance according to a ratio of the base pixel unit to the smallest pixel unit capable of being indicated by the motion vector of the current block.

According to an embodiment, the inter-prediction performer 1720 may up-scale the differential distance when the base pixel unit is greater than the smallest pixel unit capable of being indicated by the motion vector of the current block.

According to an embodiment, the base motion vector of the current block may be determined from a merge candidate list used in the skip mode and the merge mode. The merge candidate list may include neighboring blocks related to the current block spatially and temporally. The neighboring blocks related to the current block spatially and temporally may include a block decoded before the current block. Accordingly, the base motion vector according to an embodiment may be determined from a motion vector of a neighboring block determined from the merge candidate list.

In the merge motion vector difference mode according to an embodiment, the merge candidate list may include up to two motion vector candidates.

The neighboring block spatially related to the current block may include, for example, a block located left of the current block and a block located top of the current block, but is not limited thereto. Also, the neighboring block related to the current block temporally may include, for example, a block located at a same point as the current block from among blocks included in a reference picture different from a current picture including the current block, and a block spatially adjacent to the block at the same point.

According to an embodiment, the inter-prediction performer 1720 may determine motion vectors of the neighboring blocks related to the current block as the base motion vector. Alternatively, the inter-prediction performer 1720 may modify the motion vectors of the neighboring blocks related to the current block and determine the modified motion vectors as the base motion vector.

According to an embodiment, the inter-prediction performer 1720 may determine the base motion vector in a same manner as a method of determining a candidate list of motion vector predictors in an advanced motion vector prediction (AMVP) mode of the high efficiency video coding (HEVC) standard.

According to an embodiment, the inter-prediction performer 1720 may determine a zero motion vector having 0 as a component as the base motion vector.

The merge candidate information of the current block according to an embodiment may be encoded via a fixed length coding (FLC) method, a unary coding method, or a truncated unary coding method, and then included in the bitstream. For example, when the merge candidate information is decoded via the FLC method, a cMax value may be 1.

When the base motion vector for the current block is determined, the inter-prediction performer 1720 may determine the motion vector by applying the base motion vector to the merge motion vector difference.

The inter-prediction information obtainer 1710 may obtain, from the bitstream, information indicating at least one of a differential distance index and a differential direction index, and the inter-prediction performer 1720 may determine the merge motion vector difference, based on at least one of the differential distance index and the differential direction index. The motion vector of the current block may be determined from the base motion vector.

The inter-prediction information obtainer 1710 according to an embodiment may decode the differential distance index via the truncated unary coding method, and at this time, a cMax value may be 7 and a cRiceParam value may be 0. The inter-prediction information obtainer 1710 according to an embodiment may decode the differential direction index via the FLC method, and at this time, a cMax value may be 3 and a cRiceParam value may be 0.

The inter-prediction performer 1720 according to an embodiment may scale the differential distance verified from the bitstream according to a ratio of the base pixel unit to the smallest pixel unit capable of being indicated by the motion vector of the current block. When the base pixel unit (for example, a ¼ pixel unit) is greater than the smallest pixel unit (for example, a ⅛ pixel unit) capable of being indicated by the motion vector of the current block, the inter-prediction performer 1720 may up-scale the differential distance verified from the bitstream.

The scaled differential distance may indicate a difference by smallest pixel units. For example, when the smallest pixel unit capable of being indicated by the motion vector of the current block is a ⅛ pixel unit and the scaled differential distance is 2, the inter-prediction performer 1720 may determine the motion vector having a difference by a pixel distance corresponding to two ⅛ pixel units from the base motion vector.

As described above, the differential distance pre-determined based on the base pixel unit is used to determine the motion vector of the current block based on the base motion vector determined from the merge candidate list, and because information indicating the differential distance based on the base pixel unit is signaled via the bitstream, the inter-prediction performer 1720 of a precision capable of indicating the smallest pixel unit, different from a precision of the base pixel unit, may scale the differential distance signaled via the bitstream, according to the smallest pixel unit.

The differential distance determined based on the base pixel unit and the differential distance scaled based on the smallest pixel unit may be the same with respect to a pixel distance.

According to an embodiment, information indicating the smallest pixel unit capable of being indicated by the motion vector of the current block may be included in the bitstream. The inter-prediction information obtainer 1710 may obtain the information indicating the smallest pixel unit from the bitstream corresponding to at least one level from among a block, a slice, and a picture.

At least one of the differential distance index and the differential direction index for determining the motion vector of the current block may be obtained from the bitstream in a transform unit level, a coding unit level, a largest coding unit level, a slice level, or a picture level.

The inter-prediction information obtainer 1710 according to an embodiment may obtain some bins among the differential distance index by performing entropy decoding using context information (context variable) and obtain remaining bins by performing entropy decoding in a bypass mode.

By performing entropy decoding in a context adaptive binary arithmetic coding (CABAC) manner on the bitstream, each bin of a syntax element may be extracted and context information may be used for each bin. An entropy decoding mode where context information is not used is referred to as the bypass mode. For entropy decoding of a current bin, it is determined whether the context information is used and which context information is to be used.

The inter-prediction information obtainer 1710 according to an embodiment may perform the entropy decoding on the bitstream in the bypass mode to obtain a bin of two bits indicating the differential direction index.

The inter-prediction information obtainer 1710 may obtain information indicating a residual motion vector from the bitstream in the transform unit level, the coding unit level, the largest coding unit level, the slice level, or the picture level.

Motion vector candidates that may be determined from the base motion vector in the merge motion vector difference mode according to an embodiment will be described below with reference to FIG. 21.

FIG. 21 illustrates positions of motion vector candidates, according to an embodiment.

The inter-prediction performer 1720 according to an embodiment may determine the motion vector of the current block by applying the merge motion vector difference to the base motion vector. According to an embodiment, when a prediction direction of the current block is bi-direction, the merge motion vector difference may be included in the bitstream only for one uni-direction. For example, information indicating the merge motion vector difference may be included in the bitstream only for a uni-direction of any one of a list 0 direction and a list 1 direction.

FIG. 21 illustrates motion vectors that may be determined in the merge motion vector difference mode in bi-directional prediction.

A base motion vector 2125 in an L0 direction and a base motion vector 2135 in an L1 direction of a current block 2110 of a current picture 2100 are determined in a merge candidate list. The base motion vector 2125 in the L0 direction indicates a location of a broken line shape in an L0 reference picture 2120, and the base motion vector 2135 in the L1 direction indicates a location of a broken line shape in an L1 reference picture 2130.

However, in the merge motion vector difference mode, the motion vector difference may be applied to each of the base motion vector 2125 and the base motion vector 2135 in the L1 direction, based on the differential direction index and the differential distance index.

For example, it may be determined whether a distance between a base motion vector and a motion vector candidate is s, 2s, or 3s, according to the differential distance index. When the differential distance index indicates s, a motion vector candidate generated as a result of applying the motion vector difference to the base motion vector may indicate a location of a black circle among the L0 reference picture 2120 and the L1 reference picture 2130. When the differential distance index indicates 2s, the motion vector candidate generated as the result of applying the motion vector difference to the base motion vector may indicate a location of a white circle among the L0 reference picture 2120 and the L1 reference picture 2130.

For example, it may be determined whether a direction between the base motion vector and the motion vector candidate is + or − in x and y axis directions, according to the differential direction index. In particular, the differential direction index may indicate one of (+, 0), (−, 0), (0, +), and (0, −) in an (x,y) axis direction.

Accordingly, a motion vector indicating one location among the L0 reference picture 2120 and the L1 reference picture 2130 may be determined by combining the differential distance index and the differential direction index.

Hereinafter, a method of determining the motion vector candidates that may be determined from the base motion vector will be described with reference to FIGS. 22 through 25.

FIGS. 22 through 25 are diagrams showing the motion vector candidates displayed on a coordinate plane, and illustrate the motion vector candidates determined according to the differential distance pre-determined based on the base pixel unit corresponding to a ¼ pixel unit.

Referring to FIGS. 22 through 25, the inter-prediction performer 1720 may determine candidates located according to a certain shape with respect to configuring the motion vector candidates. The certain shape may similar to a polygon such as a diamond or a rectangle, or a circle.

The inter-prediction performer 1720 may determine candidates in a uniform differential distance from a point corresponding to the base motion vector as the motion vector candidates. The inter-prediction performer 1720 may determine the motion vector candidates in a first differential distance from a pre-set point, determine the motion vector candidates in a second differential distance from the pre-set point, and determine the motion vector candidates in an n-th differential distance from the pre-set point. The differential distance may be determined according to a definition of a user. Alternatively, the inter-prediction performer 1720 may directly determine the differential distance based on information related to the current block, a temporal layer, or a group of pictures (GOP), or obtain, via the bitstream, information indicating the differential distance for determining the motion vector candidates.

The inter-prediction performer 1720 may determine the differential distance for determining the motion vector candidate of the current block according to a differential distance determined in a high level higher than a level corresponding to the current block.

The number of motion vector candidates may be determined independently for each differential distance. The inter-prediction performer 1720 may determine the number of motion vector candidates for each differential distance of the current block, according to information about the number determined in the high level higher than the level corresponding to the current block.

Figure 22:
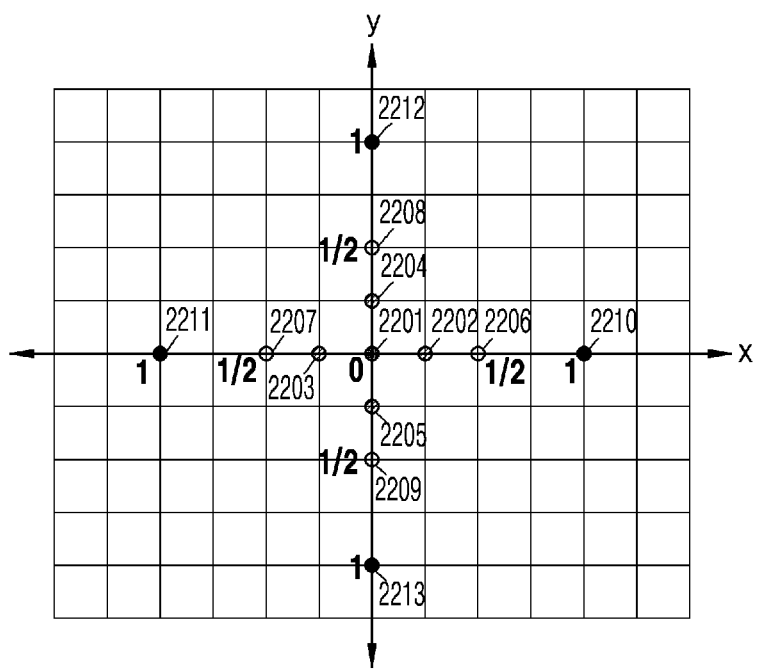
FIGS. 22 through 25 illustrate motion vector candidates displayed on a coordinate plane.
Figure 23:
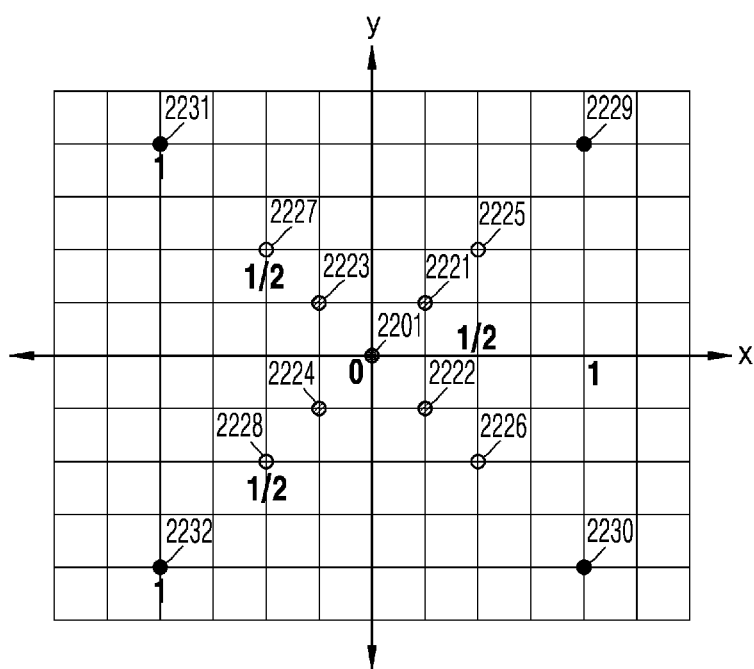

FIGS. 22 and 23 illustrate cases in which the number of motion vector candidates in each differential distance is 4. Also, in FIGS. 22 and 23, there are 3 differential distances, but the number of differential distances is not limited to 3.

Referring to FIG. 22, the inter-prediction performer 1720 may determine motion vector candidates having a distribution of a diamond shape based on a base motion vector (x,y) 2201.

The inter-prediction performer 1720 may determine motion vector candidates (x+1, y) 2202, (x−1, y) 2203, (x, y+1) 2204, and (x, y−1) 2205 in the differential distance of 1 from the base motion vector (x,y) 2201.

The inter-prediction performer 1720 may determine motion vector candidates (x+2, y) 2206, (x−2, y) 2207, (x, y+2) 2208, and (x, y−2) 2209 in the differential distance of 2 from the base motion vector (x,y) 2201.

The inter-prediction performer 1720 may determine motion vector candidates (x+4, y) 2210, (x−4, y) 2211, (x, y+4) 2212, and (x, y−4) 2213 in the differential distance of 4 from the base motion vector (x,y) 2201.

Referring to FIG. 23, the inter-prediction performer 1720 may determine motion vector candidates having a distribution of a rectangular shape based on a base motion vector (x,y) 2201.

The inter-prediction performer 1720 may determine motion vector candidates (x+1, y+1) 2221, (x+1, y−1) 2222, (x−1, y+1) 2223, and (x−1, y−1) 2224 in the differential distance of about 1 based on the base motion vector (x,y) 2201.

The inter-prediction performer 1720 may determine motion vector candidates (x+2, y+2) 2225, (x+2, y−2) 2226, (x−2, y+2) 2227, and (x−2, y−2) 2228 in the differential distance of about 2 based on the base motion vector (x,y) 2201.

The inter-prediction performer 1720 may determine motion vector candidates (x+4, y+4) 2229, (x+4, y−4) 2230, (x−4, y+4) 2231, and (x−4, y−4) 2232 in the differential distance of about 4 based on the base motion vector (x,y) 2201.

Figure 24:
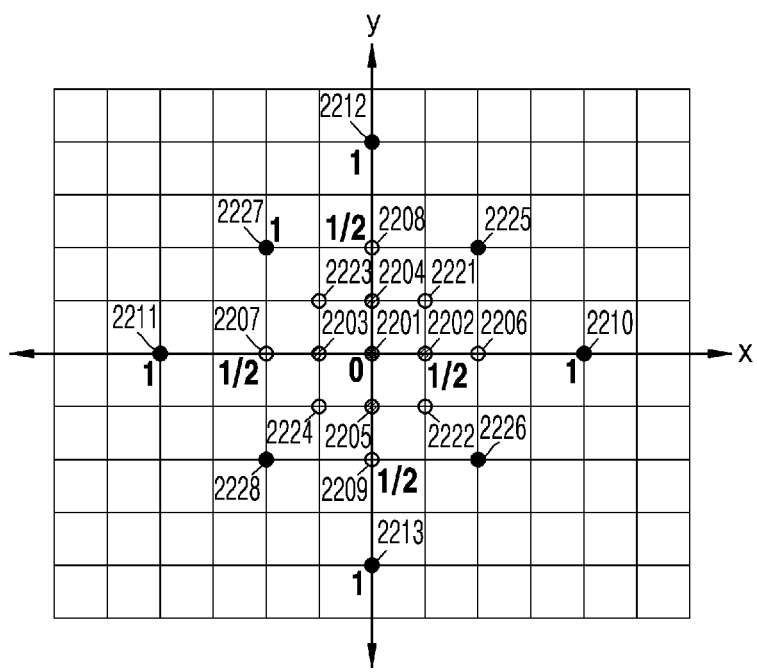

Referring to FIG. 24, the inter-prediction performer 1720 may differently determine the number of motion vector candidates according to differential distances.

In detail, the inter-prediction performer 1720 may determine eight motion vector candidates (x+1, y) 2202, (x−1, y) 2203, (x, y+1) 2204, (x, y−1) 2205, (x+1, y+1) 2221, (x+1, y−1) 2222, (x−1, y+1) 2223, and (x−1, y−1) 2224 in the differential distance of about 1 from the base motion vector (x,y) 2201.

Also, the inter-prediction performer 1720 may determine eight motion vector candidates (x+2, y) 2206, (x−2, y) 2207, (x, y+2) 2208, (x, y−2) 2209, (x+2, y+2) 2225, (x+2, y−2) 2226, (x−2, y+2) 2227, and (x−2, y−2) 2228 in the differential distance of about 2 from the base motion vector (x,y) 2201.

The inter-prediction performer 1720 may determine four motion vector candidates (x+4, y) 2210, (x−4, y) 2211, (x, y+4) 2212, and (x, y−4) 2213 within the differential distance of about 4 from the base motion vector (x,y) 2201.

Figure 25:
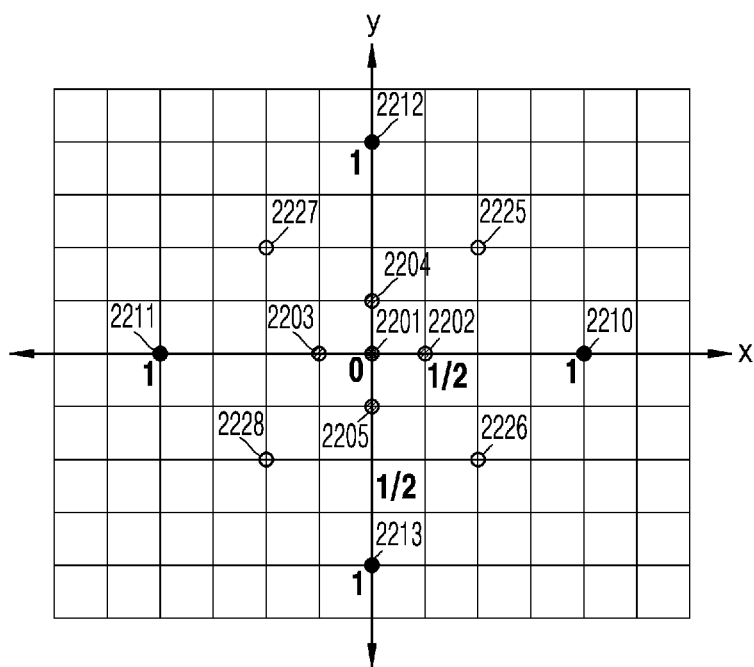

Referring to FIG. 25, the inter-prediction performer 1720 may variously determine a distribution shape of the motion vector candidates for each differential distance. For example, the inter-prediction performer 1720 may determine the motion vector candidates (x+1, y) 2202, (x−1, y) 2203, (x, y+1) 2204, and (x, y−1) 2205 having the distribution of a diamond shape, based on the base motion vector (x,y) 2201.

Also, the inter-prediction performer 1720 may determine motion vector candidates (x+2, y+2) 2225, (x+2, y−2) 2226, (x−2, y−2) 2228, and (x−2, y+2) 2227 having a distribution of a rectangular shape, based on the base motion vector (x,y) 2201.

Also, the inter-prediction performer 1720 may determine motion vector candidates (x+4, y) 2210, (x−4, y) 2211, (x, y+4) 2212, and (x, y−4) 2213 having a distribution of a diamond shape, based on the base motion vector (x,y) 2201. The distribution shape of motion vector candidates included in each candidate group may have various distribution shapes as well as those shown in FIG. 25.

According to an embodiment, the inter-prediction performer 1720 may determine the motion vector candidates located in different differential distances for each base motion vector. For example, from among a plurality of base motion vectors, a motion vector candidate having a differential distance of 1 may be determined for a first base motion vector, and a motion vector candidate having a differential distance of 2 may be determined for a second base motion vector. Alternatively, for example, a motion vector candidate having a differential distance of 1 and a motion vector candidate having a differential distance of 2 may be determined for the first base motion vector, and a motion vector candidate having a differential distance of 4 and a motion vector candidate having a differential distance of 8 may be determined for the second base motion vector.

When different differential distances are mapped to base motion vectors in an 1:1 manner, the inter-prediction information obtainer 1710 may obtain, from the bitstream, only information indicating the base motion vector of the current block or information indicating the differential distance and determine the differential distance for specifying the motion vector of the current block and the base motion vector of the current block.

As described above, the differential distance for determining the motion vector candidates may be determined based on the base pixel unit, and when the smallest pixel unit capable of being indicated by the motion vector of the current block is different from the base pixel unit, the inter-prediction performer 1720 may scale the pre-set differential distance for configuring a candidate group for each base motion vector.

When the motion vector of the current block is capable of indicating pixels corresponding to an integer pixel unit, a ½ pixel unit, a ¼ pixel unit, and a ⅛ pixel unit, the smallest pixel unit capable of being indicated by the motion vector of the current block is ⅛ pixel unit. Also, when the base pixel unit is a ¼ pixel unit, the inter-prediction performer 1720 may up-scale the differential distance. According to an embodiment, the inter-prediction performer 1720 may up-scale the differential distance according to a ratio of the base pixel unit to the smallest pixel unit capable of being indicated by the motion vector of the current block. When the smallest pixel unit capable of being indicated by the motion vector of the current block is an m pixel unit, the base pixel unit is an n pixel unit, and the differential distance is k, the inter-prediction performer 1720 may up-scale the differential distance of k by k×n/m.

The inter-prediction information obtainer 1710 according to an embodiment may determine the prediction mode of the current block to be one of the skip mode and the merge mode. In the skip mode or the merge mode, prediction may be performed according to the merge motion vector difference mode using the merge motion vector difference and the motion vector determined in the merge candidate list of the current block. When the prediction is performed according to the merge motion vector difference mode, the inter-prediction information obtainer 1710 may obtain the merge candidate information indicating one candidate in the merge candidate list by performing entropy decoding on the bitstream by applying one piece of context information.

The inter-prediction performer 1720 according to an embodiment may determine the base motion vector from the one candidate determined based on the merge candidate information, in the merge candidate list. The inter-prediction performer 1720 may determine the merge motion vector difference by using the distance index of the merge motion vector difference and the direction index of the merge motion vector difference of the current block, and determine the motion vector of the current block by using the base motion vector and the merge motion vector difference.

The reconstructor 1730 according to an embodiment may reconstruct the current block by using the motion vector of the current block. The reconstructor 1730 may determine a reference block in a reference picture by using the motion vector of the current block, and determine prediction samples corresponding to the current block from among reference samples included in the reference block.

When the prediction mode of the current block according to an embodiment is the merge mode and the merge motion vector difference mode is selected, the inter-prediction performer 1720 may determine the base motion vector of the current block from the merge candidate list and determine the motion vector of the current block by using the base motion vector and the merge motion vector difference. When the prediction mode of the current block is the merge mode, the video decoding apparatus 1700 may parse transform coefficients of the current block from the bitstream and obtain residual samples by performing inverse quantization and inverse transform on the transform coefficients. The reconstructor 1730 may determine reconstructed samples of the current block by combining the prediction samples of the current block and the residual samples of the current block.

When the prediction mode of the current block according to an embodiment is the skip mode and the merge motion vector difference mode is selected, the inter-prediction performer 1720 may determine the motion vector of the current block by using the merge motion vector difference and the base motion vector determined from the merge candidate list. However, because the prediction mode of the current block is the skip mode, the video decoding apparatus 1700 does not parse the transform coefficients of the current block from the bitstream and thus does not obtain the residual samples. In the skip mode, the reconstructor 1730 may determine the prediction samples of the current block as the reconstructed samples of the current block without the residual samples.

Hereinafter, a video decoding method in which inter-prediction is performed by obtaining prediction information to execute the merge motion vector difference mode in the skip mode or the merge mode will be described with reference to FIG. 18.

Figure 18:
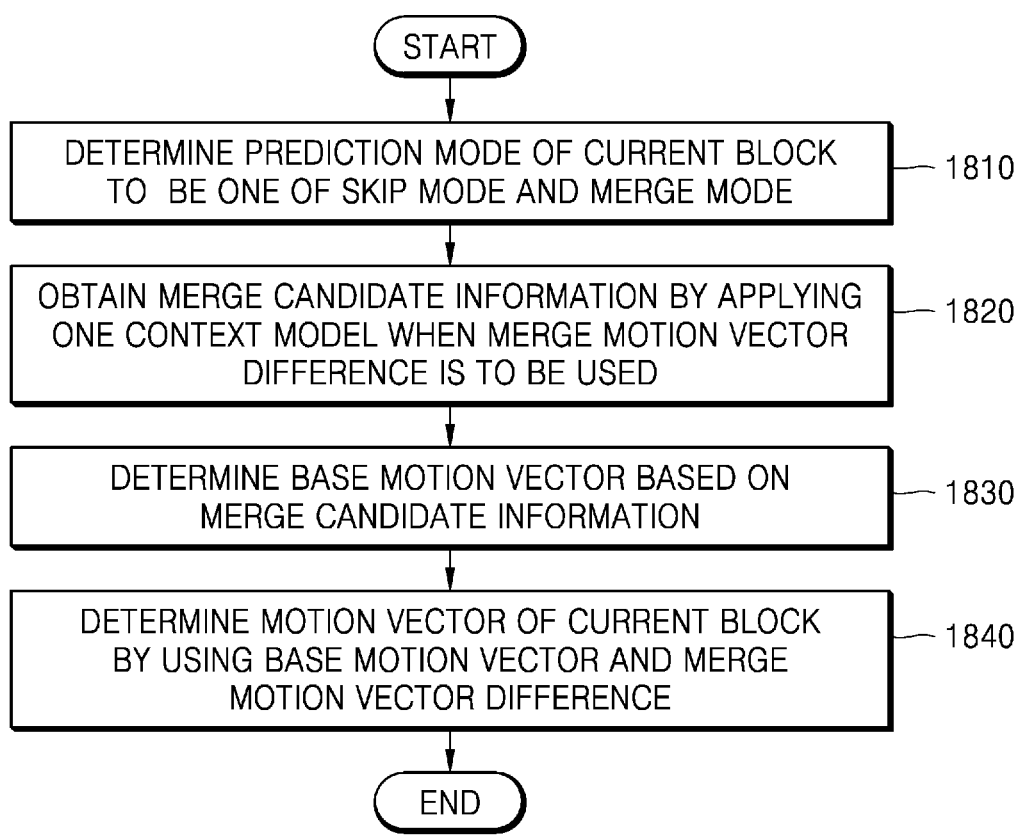
FIG. 18 is a flowchart of a video decoding method according to an embodiment.

FIG. 18 is a flowchart of a video decoding method according to an embodiment.

In operation 1810, the inter-prediction performer 1720 may determine the prediction mode of the current block to be one of the skip mode and the merge mode.

When the inter-prediction performer 1720 determines the prediction mode of the current block to be the skip mode in operation 1810, the inter-prediction information obtainer

1710 may obtain the merge difference mode information indicating whether the merge motion vector difference and the motion vector determined from the merge candidate list of the current block is to be used. In other words, the merge difference mode information indicates whether the merge motion vector difference mode is applied when the current block is in the skip mode.

Even when the inter-prediction performer 1720 determines the prediction mode of the current block to be the merge mode in operation 1810, the inter-prediction information obtainer 1710 may obtain the merge difference mode information indicating whether the merge motion vector difference and the motion vector determined from the merge candidate list of the current block is to be used. In other words, the merge difference mode information indicates whether the merge motion vector difference mode is applied when the current block is in the merge mode.

The inter-prediction information obtainer 1710 may perform the entropy decoding using the context information to obtain the merge difference mode information in the skip mode or the merge mode. The context information for obtaining the merge difference mode information in the skip mode and the context information for obtaining the merge difference mode information in the merge mode may be the same.

According to an embodiment, the merge difference mode information obtained in the skip mode and the merge difference mode information obtained in the merge mode may be obtained via a same syntax element. When the merge difference mode information obtained in the skip mode and the merge difference mode information obtained in the merge mode are obtained via the same syntax element, it is determined whether the merge motion vector difference mode is selected in the skip mode and the merge mode, based on one piece of merge difference mode information, and thus the syntax element is parsed based on one piece of context information and the merge difference mode information for the skip mode and the merge mode may be obtained.

According to another embodiment, even when the merge difference mode information obtained in the skip mode and the merge difference mode information obtained in the merge mode are obtained via separate syntax elements, the syntax elements may be parsed based on the same context information, and thus the merge difference mode information in the skip mode and the merge difference mode information in the merge mode may be obtained by using one piece of context information.

When the merge difference mode information is obtained, operation 1820 is performed.

In operation 1820, the inter-prediction information obtainer 1710 may obtain the merge candidate information by performing the entropy decoding on the bitstream by applying the one piece of context information when the merge motion vector difference and the motion vector determined from the merge candidate list of the current block is to be used. The merge candidate information indicates one candidate in the merge candidate list.

The inter-prediction performer 1720 may determine whether the merge motion vector difference mode is selected for the current block, based on the merge difference mode information obtained in the skip mode or the merge mode. When the merge motion vector difference mode is selected for the current block, i.e., when the merge motion vector difference and the motion vector determined from the merge candidate list of the current block is to be used, the inter-prediction information obtainer 1710 may obtain the merge candidate information from the bitstream. The merge candidate information is information of 1 bit and thus may be obtained by using one piece of context information for a first bin.

The inter-prediction information obtainer 1710 may perform the entropy decoding using the context information to obtain the merge candidate information in the skip mode or the merge mode. The context information for obtaining the merge candidate information in the skip mode and the context information for obtaining the merge candidate information in the merge mode may be the same.

According to an embodiment, when the merge candidate information obtained in the skip mode and the merge candidate information obtained in the merge mode are obtained via a same syntax element, the syntax element is parsed based on one piece of context information, and thus the merge candidate information for the skip mode and the merge candidate information for the merge mode may be obtained.

According to another embodiment, even when the merge candidate information obtained in the skip mode and the merge candidate information obtained in the merge mode are obtained via separate syntax elements, the syntax elements are parsed based on the same context information, and thus the merge candidate information for the skip mode and the merge candidate information for the merge mode may be obtained by using one piece of context information.

In operation 1830, the inter-prediction performer 1720 may determine the base motion vector from the one candidate determined based on the merge candidate information, in the merge candidate list. When the merge motion vector difference mode is selected in the skip mode or the merge mode, the merge candidate list may include up to two candidates. In this case, the merge candidate information may be a flag of 1 bit.

According to an embodiment, when prediction is performed in the merge mode, a number of pieces of context information required to obtain a general merge index indicating one candidate in the merge candidate list and a number of pieces of context information required to obtain the merge candidate information may be the same.

In operation 1840, the inter-prediction performer 1720 may determine the merge motion vector difference of the current block by using the distance index of the merge motion vector difference of the current block and the direction index of the merge motion vector difference, and determine the motion vector of the current block by using the base motion vector and the merge motion vector difference.

The inter-prediction information obtainer 1710 may obtain two bins indicating the direction index of the merge motion vector difference by performing the entropy decoding on the bitstream via a bypass mode. The inter-prediction information obtainer 1710 may obtain a first bin indicating the distance index of the merge motion vector difference by performing the entropy decoding using the context information on the bitstream, and obtain remaining bins indicating the distance index of the merge motion vector difference by performing the entropy decoding via the bypass mode.

In a general motion vector prediction mode (AMVP or advanced temporal motion vector prediction (ATMVP)) that is neither skip mode nor the merge mode, the video decoding apparatus 1700 obtains a motion vector predictor index and a motion vector difference. The video decoding apparatus 1700 may determine a motion vector predictor indicated by the motion vector predictor index in a motion vector predictor list, and determine a motion vector by combining the motion vector predictor and motion vector difference information.

Compared to the general motion vector prediction mode, the skip mode and the merge mode do not use the motion vector difference. However, when the merge motion vector difference mode is selected in the skip mode or the merge mode, the merge motion vector difference is used. Compared to the general motion vector prediction mode, the merge motion vector difference in the merge motion vector difference mode has expression brevity compared to the motion vector difference.

For example, information required to represent a general motion vector difference in an L0 prediction direction or an L1 prediction direction includes information abs_mvd_greater0_flag indicating whether an absolute value of the motion vector difference is greater than 0, information abs_mvd_greater1_flag indicating whether the absolute value of the motion vector difference is greater than 1, information abs_mvd_minus2 indicating a value obtained by subtracting 2 from the absolute value of the motion vector difference, and information mvd_sign_flag indicating a sign of the motion vector difference.

On the other hand, information required to represent the merge motion vector difference in the L0 prediction direction or the L1 prediction direction is only differential direction information and differential distance information. Accordingly, because the merge motion vector difference may be represented by using only the differential direction information and the differential distance index, an amount of bits required to signal the merge motion vector difference may be remarkably low compared to an amount of bits required to signal the general motion vector difference.

Hereinafter, a video encoding apparatus performing inter-prediction by selecting a merge motion vector difference mode in a skip mode or a merge mode will be described with reference to FIG. 19.

Figure 19:
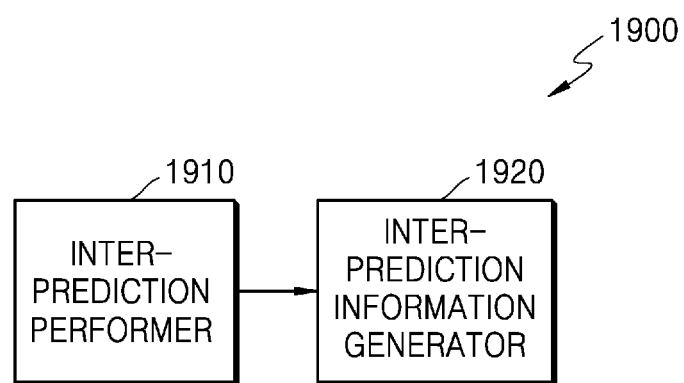
FIG. 19 is a block diagram of a video encoding apparatus according to an embodiment.

FIG. 19 is a block diagram of a video encoding apparatus according to an embodiment.

Referring to FIG. 19, a video encoding apparatus 1900 according to an embodiment may include an inter-prediction performer 1910, and an inter-prediction information generator 1920.

The video encoding apparatus 1900 may encode motion information determined by performing inter-prediction and output the encoded motion information in a form of a bitstream.

The video encoding apparatus 1900 according to an embodiment may include a central processor (not shown) for controlling the inter-prediction performer 1910 and the inter-prediction information generator 1920. Alternatively, the inter-prediction performer 1910 and the inter-prediction information generator 1920 may operate by their own processors (not shown), and the processors may systematically operate with each other to operate the video encoding apparatus 1900. Alternatively, the inter-prediction performer 1910 and the inter-prediction information generator 1920 may be controlled according to control of an external processor (not shown) of the video encoding apparatus 1900.

The video encoding apparatus 1900 may include one or more data storages (not shown) storing input/output data of the inter-prediction performer 1910 and the inter-prediction information generator 1920. The video encoding apparatus 1900 may include a memory controller (not shown) for controlling data input and output of the data storage.

The video encoding apparatus 1900 may perform an image encoding operation including prediction by connectively operating with an internal video encoding processor or an external video encoding processor so as to encode an image. The internal video encoding processor of the video encoding apparatus 1900 according to an embodiment may perform a basic image encoding operation in a manner that not only a separate processor but also an image encoding processing module included in a central processing apparatus or a graphic processing apparatus perform the basic image encoding operation.

The inter-prediction performer 1910 according to an embodiment may determine a motion vector of a current block by performing inter-prediction on the current block.

When the inter-prediction is performed on the current block in one of a skip mode and a merge mode, the inter-prediction information generator 1920 according to an embodiment may determine whether a merge motion vector difference and a base motion vector determined from a merge candidate list of the current block is to be used. When the merge motion vector difference is to be used, the inter-prediction information generator 1920 may generate merge candidate information by performing entropy encoding on a bitstream by applying one piece of context information. The merge candidate information indicates the base motion vector in the merge candidate list. The inter-prediction information generator 1920 may generate a distance index of a merge motion vector difference corresponding to a difference between the base motion vector and a motion vector of the current block, and a direction index of the merge motion vector difference.

Hereinafter, a process by which the video encoding apparatus 1900 performs the inter-prediction by selecting a merge motion vector difference mode in the skip mode or the merge mode will be described with reference to FIG. 20.

Figure 20:
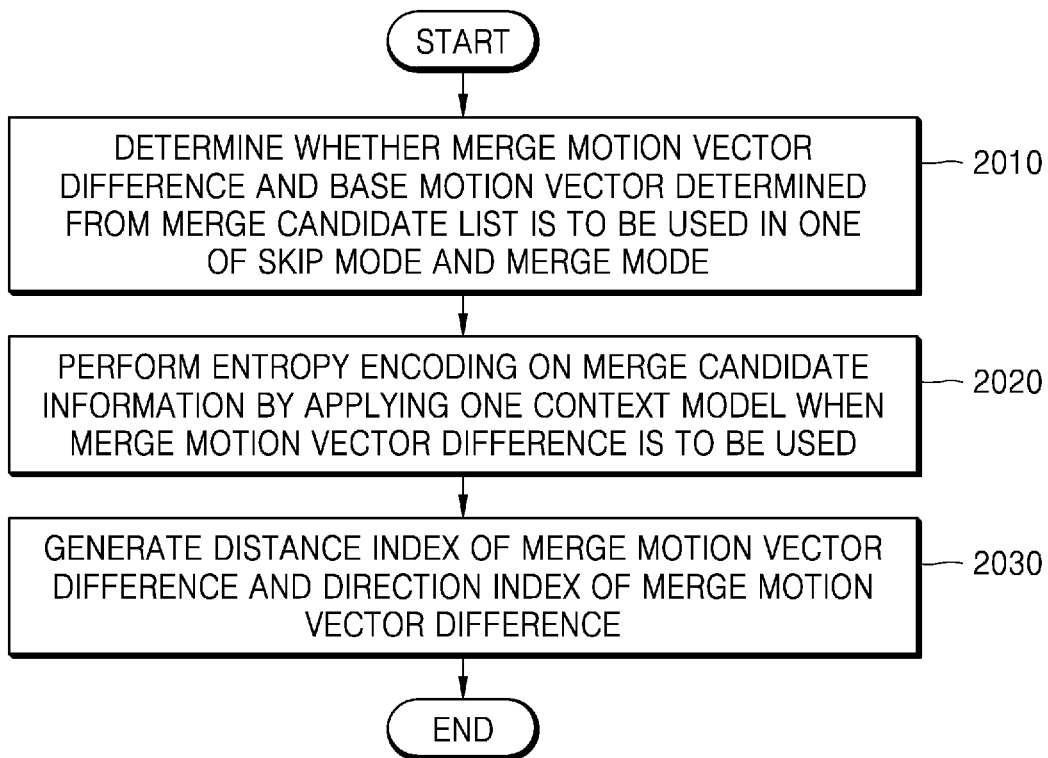
FIG. 20 is a flowchart of a video encoding method according to an embodiment.

FIG. 20 is a flowchart of a video encoding method according to an embodiment.

In operation 2010, when the inter-prediction is performed on the current block in one of the skip mode and the merge mode, the inter-prediction performer 1910 may determine whether the merge motion vector difference and the base motion vector determined from the merge candidate list of the current block is to be used.

In operation 2020, when the merge motion vector difference is to be used, the inter-prediction information generator 1920 may generate the merge candidate information indicating one base motion vector in the merge candidate list by performing entropy encoding on the bitstream by applying one piece of context information.

In operation 2030, the inter-prediction information generator 1920 may generate the distance index of the merge motion vector difference corresponding to the difference between the base motion vector and the motion vector of the current block, and the direction index of the merge motion vector difference.

The inter-prediction performer 1910 according to an embodiment may determine the motion vector of the current block, which indicates a reference block in a reference picture.

The inter-prediction performer 1910 according to an embodiment may determine the prediction mode of the motion vector of the current block to be one of the skip mode and the merge mode. The inter-prediction information generator 1920 may generate skip mode information indicating whether the prediction mode of the current block is the skip mode and merge mode information indicating whether the prediction mode is the merge mode.

When the prediction mode of the current block is the skip mode or the merge mode, the inter-prediction information generator 1920 may determine whether the motion vector of the current block is predicted in the merge motion vector difference mode using the merge motion vector difference and the base motion vector determined from the merge candidate list of the current block. The inter-prediction information generator 1920 may generate the merge difference mode information indicating whether the motion vector is predicted in the merge motion vector difference mode.

When motion information is predicted according to the merge motion vector difference mode, the inter-prediction information generator 1920 according to an embodiment may determine the merge candidate information indicating the base motion vector in the merge candidate list. The inter-prediction information generator 1920 may perform the entropy decoding applying one piece of context information on the merge candidate information to encode the merge candidate information indicating one candidate in the merge candidate list.

The inter-prediction information generator 1920 may determine the merge motion vector difference between the motion vector of the current block and the base motion vector and generate the distance index of the merge motion vector difference of the current block and the direction index of the merge motion vector difference.

When the prediction mode of the current block according to an embodiment is the merge mode and the merge motion vector difference mode is selected, the inter-prediction information generator 1920 may generate the merge candidate information indicating the base motion vector of the current block from the merge candidate list and generate the differential distance information and the differential direction information for indicating the merge motion vector difference between the motion vector of the current block and the base motion vector.

When the prediction mode of the current block is the merge mode, the video encoding apparatus 1900 may determine samples of the reference block indicated by the motion vector of the current block as the prediction samples of the current block. The video encoding apparatus 1900 may determine the residual samples that are difference between original samples and prediction samples of the current block. The video encoding apparatus 1900 may encode the transform coefficients generated by performing transform and quantization on the residual samples of the current block.

According to an embodiment, when the prediction mode of the current block is the skip mode, the current block is encoded only with the prediction samples of the current block, and thus the video encoding apparatus 1900 does not encode the residual samples of the current block. Even when the prediction mode of the current block according to an embodiment is the skip mode and the merge motion vector difference mode is selected, the inter-prediction information generator 1920 may encode the merge difference mode information, the merge candidate information, the differential distance information, and the differential direction information without encoding the residual samples.

When the inter-prediction performer 1910 determined the prediction mode of the current block to be the skip mode, according to an embodiment, it may be determined whether to select the merge motion vector difference mode of encoding the motion vector by using the merge motion vector difference and the base motion vector determined from the merge candidate list of the current block. When the merge motion vector difference mode is selected, the inter-prediction information generator 1920 may generate the merge difference mode information. In other words, the merge difference mode information indicates whether the merge motion vector difference mode is applied when the current block is in the skip mode.

According to an embodiment, when the inter-prediction performer 1910 determined the prediction mode of the current block to be the merge mode, it may be determined whether to select the merge motion vector difference mode. When the merge motion vector difference mode is selected, the inter-prediction information generator 1920 may generate the merge difference mode information.

The inter-prediction information generator 1920 may perform the entropy encoding using the context information to encode the merge difference mode information in the skip mode or the merge mode. The context information for encoding the merge difference mode information in the skip mode and the context information for encoding the merge difference mode information in the merge mode may be the same.

When the merge difference mode information in the skip mode and the merge difference mode information in the merge mode are encoded via the same syntax element, it is represented whether the merge motion vector difference mode is selected in the skip mode and the merge mode via one piece of merge difference mode information, and thus the syntax element is encoded based on one piece of context information and the merge difference mode information for the skip mode and the merge mode may be encoded.

According to another embodiment, when the merge difference mode information in the skip mode and the merge difference mode information in the merge mode are encoded via separate syntax elements, the merge difference mode information in the skip mode and the merge difference mode information in the merge mode may be encoded by using one piece of context information.

When the motion vector is encoded in the merge motion vector difference mode, the inter-prediction information generator 1920 may perform the entropy encoding by applying one piece of context information to the merge candidate information. The merge candidate information indicates one candidate in the merge candidate list. The merge candidate information according to an embodiment is information of 1 bit and thus may be obtained by using one piece of context information for a first bin.

According to an embodiment, the context information for encoding the merge candidate information in the skip mode and the context information for encoding the merge candidate information in the merge mode may be the same.

According to an embodiment, when the merge candidate information in the skip mode and the merge candidate information in the merge mode are encoded via the same syntax element, the syntax element is encoded by using one piece of context information, and thus the merge candidate information for the skip mode and the merge candidate information for the merge mode may be encoded by using one piece of context information.

According to another embodiment, even when the merge candidate information in the skip mode and the merge candidate information in the merge mode are encoded via the separate syntax elements, the syntax elements may be encoded by using the same context information, and thus the merge candidate information for the skip mode and the merge candidate information for the merge mode may be encoded by using one piece of context information.

When the merge motion vector difference mode is selected in the skip mode or the merge mode, the merge candidate list may include up to two candidates. In this case, the merge candidate information may be a flag of 1 bit.

According to an embodiment, when prediction is performed in the merge mode, the number of pieces of context information required to obtain the general merge index indicating one candidate in the merge candidate list and the number of pieces of context information required to obtain the merge candidate information may be the same.

The inter-prediction information generator 1920 may perform the entropy encoding on the distance index of the merge motion vector difference of the current block and the direction index of the merge motion vector difference.

The inter-prediction information generator 1920 according to an embodiment may perform the entropy encoding on two bins indicating the direction index of the merge motion vector difference respectively via the bypass mode. The inter-prediction information generator 1920 may perform the entropy encoding on a first bin indicating the distance index of the merge motion vector difference by using the context information, and perform the entropy encoding on remaining bins indicating the distance index of the merge motion vector difference respectively in the bypass mode.

FIG. 26 illustrate values and meanings of merge candidate information, merge differential distance indexes, and merge differential direction indexes, according to an embodiment.

The merge differential distance index indicates a distance index of a merge motion vector difference. The merge differential direction index indicates a direction index of the merge motion vector difference.

The video decoding apparatus 1700 may determine a motion vector of a current block based on the merge candidate information, the merge differential distance index, and the merge differential direction index.

A table 2600 of FIG. 26 illustrates the merge candidate information according to an embodiment and a motion vector candidate corresponding thereto. A merge candidate list according to an embodiment includes four motion vector candidates ($1^{st}$, $2^{nd}$, $3^{rd}$, and $4^{th}$ MV candidates) and the merge candidate information may be displayed in an index (0, 1, 2, or 3) indicating one of them.

In a merge motion vector difference mode, one motion vector candidate indicated by the merge candidate information among the merge candidate list may be determined as a base motion vector.

In a table 2610 of FIG. 26, the merge differential distance index according to an embodiment is an integer among 0 to 7, and each index may be binarized according to a truncated unary coding method. The merge differential distance index may indicate one of $2^N$, wherein N is 0 to 7. A merge differential distance is determined based on a base pixel unit, and when the base pixel unit is ¼, a merge motion vector differential distance corresponding to the merge differential distance index 0 may denote a ¼ pixel distance and a merge motion vector differential distance corresponding to the merge differential distance index 1 may denote a ½ pixel distance. A merge motion vector differential distance corresponding to the merge differential distance index 7 may denote a 32 pixel distance.

As described above, when a smallest pixel unit capable of being indicated by the motion vector of the current block is smaller than the base pixel unit, the merge motion vector differential distance may be scaled according to a ratio of the smallest pixel unit to the base pixel unit. For example, when the base pixel unit is ¼ pixel unit and the smallest pixel unit is ⅛ pixel unit, and when an index indicating the merge motion vector differential distance obtained from a bitstream is 0, a merge motion vector differential distance 1 corresponding to the index 0 may be up-scaled to 2.

Also, in a table 2620, a merge motion vector differential direction index of a binary string 00 denotes a motion vector candidate changed along a + direction in an X axis based on the base motion vector, and a merge motion vector differential direction of a binary string 11 denotes a motion vector candidate changed along a − direction in a Y axis based on the base motion vector.

The merge candidate information, the merge differential distance index, and the merge differential direction index of FIG. 26 are only examples and indexes available in the merge motion vector difference mode proposed in the present disclosure are not limited thereto.

For example, the number of candidates included in the merge candidate list in the merge motion vector difference mode may be limited to 2, and the merge candidate information may be an index of 1 bit.

FIG. 27 illustrates equations for obtaining a motion vector by using a base motion vector and a merge motion vector difference, according to an embodiment.

mvLX[x][y][n] denotes a motion vector of a current block. x, y denotes x, y coordinates of the current block, and n denotes one of a horizontal direction component and a vertical direction component of a motion vector mvLX. mvLX[x][y][0] denotes the horizontal direction component of the motion vector mvLX and mvLX[x][y][1] denotes the vertical direction component of the motion vector mvLX.

mxLXN[m] denotes a base motion vector indicated by merge candidate information in the merge candidate list. m denotes one of a horizontal direction component and a vertical direction component of a base motion vector mvLXN. mvLXN[0] denotes the horizontal direction component of the base motion vector mvLXN and mvLXN[1] denotes the vertical direction component of the base motion vector mvLXN.

refineMxLX[I] denotes a merge motion vector difference. I denotes one of a horizontal direction component and a vertical direction component of a merge motion vector difference refineMxLX. refineMxLX[0] denotes the horizontal direction component of the merge motion vector difference refineMxLX and refineMxLX[1] denotes the vertical direction component of the merge motion vector difference refineMxLX.

In mvLX, mxLXN, and refineMxLX, LX denotes one of an L0 prediction direction and an L1 prediction direction. Accordingly, mvL0, mxL0N, and refineMxL0 denote the motion vector, the base motion vector, and the merge motion vector difference in the L0 prediction direction, and mvL1, mxL1N, and refineMxL1 denote the motion vector, the base motion vector, and the merge motion vector difference in the L1 prediction direction.

The video decoding apparatus 1700 according to an embodiment obtains the merge candidate information from a bitstream, and determines the horizontal direction component mxLXN[0] of the base motion vector indicated by the merge candidate information from the merge candidate list and the vertical direction component mxLXN[1] of the base motion vector.

The video decoding apparatus 1700 according to an embodiment obtains a merge differential direction index and a merge differential distance index from the bitstream, and determines the horizontal direction component refineMxLX[0] of the merge motion vector difference and the vertical direction component refineMxLX[1] of the merge motion vector difference by using the merge differential direction index and the merge differential distance index.

The video decoding apparatus 1700 according to an embodiment may obtain the horizontal direction component mvLX[0][0][0] of the motion vector of the current block by adding the horizontal direction component mxLXN[0] of the base motion vector and the horizontal direction component refineMxLX[0] of the merge motion vector difference, and obtain the vertical direction component mvLX[0][0][1] of the motion vector of the current block by adding the vertical direction component mxLXN[1] of the base motion vector and the vertical direction component refineMxLX[1] of the merge motion vector difference.

FIG. 28 illustrates syntaxes for obtaining merge difference mode information, merge candidate information, merge differential distance indexes, and merge differential direction indexes, according to an embodiment.

The video decoding apparatus 1700 according to an embodiment may obtain a syntax element cu_skip_flag indicating whether a current block is predicted in a skip mode, from a coding_unit syntax of a bitstream. When the current block is predicted in the skip mode (if(cu_skip_flag)), the video decoding apparatus 1700 may obtain a syntax element umve_flag indicating whether the current block is predicted in a merge motion vector difference mode. When umve_flag is 1, the video decoding apparatus 1700 may invoke an umve_idx_coding syntax. The video decoding apparatus 1700 may obtain a syntax element base_mv_idx corresponding to the merge candidate information, a syntax element distance_idx corresponding to a distance index of a merge motion vector difference, and a syntax element direction_idx corresponding to a direction index of the merge motion vector difference, from the umv_idx_coding syntax of the bitstream.

When the current block is not predicted in the skip mode (when cu_skip_flag is not 0), the video decoding apparatus 1700 may obtain a syntax element merge_flag indicating whether the current block is predicted in a merge mode. When the current block is predicted in the merge mode (if(merge_flag)), the syntax element umve_flag indicating whether the current block is predicted in the merge motion vector difference mode may be obtained. When umve_flag is 1, the video decoding apparatus 1700 may invoke the umve_idx_coding syntax. The video decoding apparatus 1700 may obtain the syntax element base_mv_idx corresponding to the merge candidate information, the syntax element distance_idx corresponding to the merge differential distance index, and the syntax element direction_idx corresponding to the merge differential direction index, from the umv_idx_coding syntax of the bitstream.

Accordingly, the video decoding apparatus 1700 may obtain the syntax element umve_flag indicating whether the current block is predicted in the merge motion vector difference mode in the skip mode and the merge mode. Even when umve_flag of the skip mode and umve_flag of the merge mode are separately obtained, both umve_flag may be obtained via entropy decoding using same context information.

Also, the video decoding apparatus 1700 may obtain the merge candidate information base_mv_idx in the skip mode and the merge mode. Even when base_mv_idx of the skip mode and base_mv_idx of the merge mode are separately obtained, both base_mv_idx may be obtained via entropy decoding using same context information.

FIG. 29 illustrates syntaxes for obtaining merge difference mode information, merge candidate information, merge differential distance indexes, and merge differential direction indexes, according to another embodiment.

The video decoding apparatus 1700 according to another embodiment may obtain a syntax element regular_merge_flag indicating whether a current block is predicted in a merge mode, from a merge_data syntax of a bitstream. When the current block is predicted in the merge mode (if(regular_merge_flag==1)), the video decoding apparatus 1700 may obtain a syntax element mmvd_merge_flag indicating whether the current block is predicted in a merge motion vector difference mode. When the current block is predicted in the merge motion vector difference mode (if (mmvd_merge_flag==1)), the video decoding apparatus 1700 may obtain a syntax element mmvd_cand_flag corresponding to the merge candidate information, a syntax element mmvd_distance_idx corresponding to a distance index of a merge motion vector difference, and a syntax element mmvd_direction_idx corresponding to a direction index of the merge motion vector difference.

Even when the current block is predicted in a skip mode, the video decoding apparatus 1700 may implicitly consider regular_merge_flag to be 1. Accordingly, when the current block is predicted in the skip mode, the video decoding apparatus 1700 may obtain the syntax element mmvd_merge_flag indicating whether the current block is predicted in the merge motion vector difference mode, and when the current block is predicted in the merge motion vector difference mode (if(mmvd_merge_flag==1)), the video decoding apparatus 1700 may obtain the syntax element mmvd_cand_flag corresponding to the merge candidate information, the syntax element mmvd_distance_idx corresponding to the distance index of the merge motion vector difference, and the syntax element mmvd_direction_idx corresponding to the direction index of the merge motion vector difference.

According to the merge_data syntax, the video decoding apparatus 1700 may analyze information related to the merge motion vector difference mode (whether the current block is predicted in the merge motion vector difference mode, the merge candidate information, the distance index of the merge motion vector difference, and the direction index of the merge motion vector difference) via the same syntax elements mmvd_merge_flag, mmvd_cand_flag, mmvd_distance_idx, and mmvd_direction_idx in the skip mode and the merge mode. However, because a prediction mode of the current block is unable to be the skip mode and the merge mode at the same time, mmvd_merge_flag, mmvd_cand_flag, mmvd_distance_idx, and mmvd_direction_idx of the skip mode are not obtained at the same time as mmvd_merge_flag, mmvd_cand_flag, mmvd_distance_idx, and mmvd_direction_idx of the merge mode, and the information related to the merge motion vector difference mode in the skip mode and the information related to the merge motion vector difference mode in the merge mode may be interpreted as independent information.

The video decoding apparatus 1700 obtains the syntax element mmvd_merge_flag indicating whether the current block is predicted in the merge motion vector difference mode in each of the skip mode and the merge mode, but may obtain the mmvd_merge_flag via entropy decoding using one piece of context information.

Also, the video decoding apparatus 1700 may obtain the merge candidate information mmvd_cand_flag in the skip mode and the merge mode. Even when mmvd_cand_flag of the skip mode and mmvd_cand_flag of the merge mode are separately obtained, both mmvd_cand_flag may be obtained via entropy decoding using same context information.

FIG. 30 is a reference table for determining context information of merge-related information, according to an embodiment.

The reference table of FIG. 30 illustrates the context information required to perform entropy decoding for each bin index of each syntax element.

For example, context information required to decode a bin index 0 of a syntax element mmvd_merge_flag indicating prediction in a merge motion vector difference mode, i.e., a first bin, is 0. Because the mmvd_merge_flag is information of 1 bit, context information for bins other than the bin index 0 is not defined (na). Accordingly, the number of pieces of context information required to perform entropy decoding on the syntax element mmvd_merge_flag indicating whether the video decoding apparatus 1700 performs prediction in the merge motion vector difference mode, i.e., on merge difference mode information, may be 1.

Also, when prediction is performed in a merge mode, the video decoding apparatus 1700 may obtain, from a bitstream, information indicating one motion vector candidate from a merge candidate list. The video decoding apparatus 1700 may obtain a syntax element merge_idx corresponding to the information indicating the motion vector candidate from the merge candidate list via entropy decoding. Context information required to decode a bin index 0, i.e. a first bin, of the merge_idx, may be 0. Remaining bins of the merge_idx may be decoded in a bypass mode.

Accordingly, the numbers of pieces of context information required to obtain the information indicating whether the video decoding apparatus 1700 performs prediction in the merge motion vector difference mode and the information indicating the motion vector candidate from the merge candidate list may be the same, i.e., 1.

One piece of context information is required to obtain a first bin of a syntax element mmvd_distance_idx corresponding to a distance index of the merge motion vector difference, and remaining bins may be decoded in a bypass mode without context information. A syntax element mmvd_direction_idx corresponding to a direction index of the merge motion vector difference may be decoded in a bypass mode without context information.

Hereinafter, a correlation between the merge motion vector difference mode and another motion vector prediction method will be described.

First, a correlation between the merge motion vector difference mode and an adaptive motion vector resolution (AMVR) mode will be described.

In the merge motion vector difference mode, when a base motion vector is determined, resolution of a motion vector may be determined by using an index indicating a size, such as a ¼, ½, 1, 4, 8, 18, 32, 64, or 128 pixel unit. In other words, when a horizontal direction component and a vertical direction component of a current base motion vector are moved by a merge differential distance index 2, it may be interpreted that the horizontal direction component and the vertical direction component are moved by a size of 1 pixel in the video decoding apparatus 1700 based on a ¼ pixel unit.

A resolution of a motion vector may use a plurality of multi-resolutions via a plurality of pieces of merge candidate information available in the merge motion vector difference mode. The plurality of resolutions may be applied not only to modification of such a resolution or a pixel unit, but also the base motion vector itself. For example, resolutions of ¼, ½, 1, 4, 8, 16, 32, 64, and 128 pixel units may be applied to the base motion vector itself. The resolution of the motion vector may be implicitly determined based on information (a resolution index) around. Alternatively, separate resolution information may be signaled before a syntax element indicating whether prediction is performed in the merge motion vector difference mode to determine the resolution of the base motion vector.

Here, the size of the motion vector difference may be defined to be a value of a resolution distance. For example, when the resolution information is 1 pixel unit, the size of the motion vector difference may be determined from among (+1,0), (−1,0), (0,+1), and (0,−1) without a separate merge differential distance index. As another example, a merge differential distance index N may be signaled and the size of the motion vector difference may be determined to be N times of the resolution. When index is 0, the size of the motion vector difference may be 1 pixel, and when index is 1, the size of the motion vector difference may be 2 pixels. Alternatively, the merge differential distance index N may be signaled and the size of the motion vector difference may be increased in a log-scale.

The signaled resolution information of the motion vector is usable in the video decoding apparatus 1700 extensively. For example, a motion vector predictor may be used in an AMVP mode by rounding off to the nearest integer by using the resolution information encoded in a higher level (skip mode or merge mode determination).

Also, in an adaptive motion vector resolution (AMVR) mode, transmission of the resolution information may be omitted and the resolution information to be applied in the AMVR mode may be determined by using the resolution information encoded in the current skip mode or merge mode determination (higher level).

In a mode prediction mode using the motion vector, resolution information of the higher level may be shared to be used. Also, each prediction mode may be executed for each resolution, and information for indicating which prediction mode is executed in which resolution may be signaled.

In the AMVR mode, the resolution of the motion vector may be set to represent the size of the motion vector difference MVD to 1.

For example, the video decoding apparatus 1700 may determine the resolution of the motion vector by obtaining an AMVR index, obtain a reference picture index, and obtain a value of the motion vector difference MVD having a value of 1, 0, or −1.

As another example, the video decoding apparatus 1700 may determine the resolution of the motion vector by obtaining the AMVR index, determine the reference picture index of the current block by using a reference picture index of a neighboring block, and obtain the value of the motion vector difference MVD having a value of 1, 0, or −1.

When a maximum representable resolution of the motion vector is in a 1/M pixel unit in a prediction method of transmitting the motion vector difference, and a resolution available in the video decoding apparatus 1700 is in a 1/N pixel unit, an offset value of the merge motion vector difference mode may be a resolution more precise than 1/M. For example, when a resolution of the motion vector transmittable in the motion vector difference is in a ¼ (quarter) pixel unit and the representable resolution (or a storage unit of the motion vector) is in 1/16 pixel unit, the offset value of the merge motion vector difference mode may be set to be more precise than the ¼ pixel unit.

A motion vector candidate that may be the base motion vector of the merge motion vector difference mode may be determined to be a representative candidate from among sub-block motion vector candidates used in ATMVP or the like. For example, a motion vector of a sub-block corresponding to a center location or a motion vector of a sub-block corresponding to an upper left location of the sub-block motion vector candidates may be determined as the representative candidate.

As another example, a sub-block candidate that may be the base motion vector of the merge motion vector difference mode may be excluded from the motion vector candidates. Accordingly, operation complexity may be reduced.

Hereinafter, whether to use an ATMVP merge candidate when determining the base motion vector in the merge motion vector difference mode will be described.

The base motion vector in the merge motion vector difference mode according to an embodiment is first determined from a merge candidate list used in the merge mode. In the merge motion vector difference mode according to another embodiment, the base motion vector may be selected not only from the merge candidate list, but also from ATMVP candidates. Information indicating whether to predict the motion vector by using the ATMVP candidate in the merge motion vector difference mode may be signaled in a slice level or a higher level (picture, sequence, sequence parameter set (SPS), or picture parameter set (PPS)).

When the ATMVP candidate is also available in the merge motion vector difference mode, all candidates of the merge candidate list and ATMVP candidate list need to be generated. However, when the ATMVP candidate is not available, the video decoding apparatus 1700 does not need to access a memory for ATMVP and does not need to access a memory in a temporal direction to configure the ATMVP candidate list, high efficiency may be achieved in terms of memory access.

Hereinafter, a method of signaling information for the merge motion vector difference mode in the slice level will be described.

To apply the merge motion vector difference mode, syntax elements corresponding to a prediction direction index indicating an L0, L1, or Bi prediction direction, merge candidate information, merge differential distance index, and merge differential direction index may be used.

Control information for the syntax elements may be transmitted to the video decoding apparatus 1700 for each slice.

Information about the number of merge differential distance index may be transmitted in the slice level. The number itself may be encoded in an FLC method and signaled. For example, when the number of merge differential distance index is 8, the number may be signaled in 3 bits.

Alternatively, 1 bit for whether to signal default setting or additional information (used number information) may be transmitted. When the used number information is 0, the number of merge differential distance indexes is 8, i.e., default setting, and when the used number information is 1, information about how many merge differential distance indexes are additionally used may be signaled in an FLC method. Information about a set maximum number of merge differential distance indexes may be signaled from a corresponding slice in a truncated unary binary method.

Here, when there is an optimum number that frequently occurs when signaling the number of merge differential distance indexes, the optimum number may be mapped to the index. For example, 4, 8, 2, and 1 combinations of the optimum numbers may be determined, and when an occurrence frequency is higher at a preceding order among of the optimum number of merge differential distance indexes, encoding may be possible in the truncated unary binary method.

Control bits related to not only encoding of maximum number information of the merge differential distance indexes, but also order rearrangement of the merge differential distance indexes may be signaled in the slice level. The control bit may also be determined to be 1 bit for indicating whether to use a default order or a signaled order. When the control bit is 0, the order is interpreted to be the default order of 1, 2, 4, 8, 16, 32, 64, and 128. However, when the control bit is 1, information about an order may be additionally signaled.

When the information about the order is signaled according to an embodiment, 8 orders may be decoded as it is, but the information about the order may be parsed only for front N that is mostly selected. For example, when N is 4, order replacement is performed only for front 4 numbers. In this case, because only one of 4 needs to be analyzed, the front four orders may be verified by parsing a number index three times by 2 bits. For example, when 10, 11, and 00 are parsed as the number index, 2, 3, 0 may be interpreted and it may be inferred that the remaining is 1. Then, actual interpreted information of the entire merge differential distance index may be 2, 3, 0, 1, 4, 5, 6, and 7. In other words, when a merge differential distance index is 1 in the merge motion vector difference mode, it is actually interpreted that a merge differential distance is 3.

N may be variously determined from 2 to 8, and may be encoded via the FLC or truncated unary binary method. Information about N may also be encoded in the slice level or may be encoded in a higher level (picture level or sequence level).

Information about a used number of the base motion vectors may also be signaled in the slice level or the higher level thereof. A default number may be pre-determined and a bit indicating whether the default number is used or changed may be signaled. When the bit is 1, the number of base motion vectors may be decoded in the FLC or truncated unary binary method.

Information about a used number of pieces of merge differential direction information may also be signaled in the slice level or the higher level thereof. A default number may be pre-determined and a bit indicating whether the default number is used or changed may be signaled. When the bit is 1, the number of base motion vectors may be decoded in the FLC or truncated unary binary method. When a default number corresponding to a same differential direction is 4, 1 bit indicating whether the number of base motion vectors is the default number is decoded and when the number of base motion vectors is not the default number, information about the number may be decoded via the FLC or truncated unary binary method.

All pieces of the information above may be determined by the video encoding apparatus 1900 based on hit-ratio information. The merge difference-related information may be processed for each ID according to an ID of a temporal layer or may be determined based the hit-ratio information regardless of the temporal layer.

Different maximum numbers or different orders of merge differential distance indexes may be applied for each size of a current block on which prediction is performed, and whether the different maximum numbers or different orders of merge differential distance indexes are applied for each size of the current block may be determined in the slice level or the higher level thereof.

Hereinabove, it has been described that a configuration of the merge difference-related information is changeable in the slice level. However, on/off of the merge motion vector difference mode may be determined in the slice level. Also, information for not applying the merge motion vector difference mode in a block of a certain size or smaller may also be signaled by transmitting additional information in the slice level. At this time, the video decoding apparatus 1700 may not parse the merge difference mode information when a width and a length of the current block are smaller than a certain threshold value or when an area calculated by multiplying the width and the length is smaller than a certain threshold value.

Hereinafter, methods of simplifying context information of the merge difference-related information will be described.

The video decoding apparatus 1700 performs entropy decoding using the context information to decode information related to the merge motion vector difference mode.

The video decoding apparatus 1700 according to an embodiment may use the context information to obtain each of the merge difference mode information in the skip mode and the merge difference mode information in the merge mode. However, the merge difference mode information in the skip mode and the merge difference mode information in the merge mode may be decoded by using same context information.

A method of setting context of context adaptive binary arithmetic coding (CABAC) for the merge difference mode information may vary. For example, the context information may be set to be smaller than a ratio of a general skip mode regardless of a quantization parameter (QP). As another example, because a probability of using the merge motion vector difference mode increases as the QP decreases, initial context information may be set to be smaller than or similar to a ratio of the skip mode. However, when the QP decreases, the probability of the merge motion vector difference mode may be set to increase.

The merge candidate information may also be decoded by using the merge motion vector difference mode in the skip mode, the merge motion vector difference mode in the merge mode, and context information used to decode index information in any one of the general skip mode and a general merge mode.

For example, context information for decoding a general merge index (information indicating one candidate in a merge candidate list) used in the general merge mode and context information for decoding the merge motion vector difference information may be different. The merge index is set such that a probability in which 0th index occurs is high, whereas the merge candidate information of the merge motion vector difference mode may set the 0th occurrence probability to less than 50% to increase the efficiency of arithmetic encoding.

As another example, context information used to decode resolution information used in a prediction mode using multi-resolution may be applied to information about the merge differential distance index.

The merge differential direction index may be obtained by using context information about a sign of motion vector difference information used in other inter-prediction methods, such as AMVP and AMVR. In relation to a syntax element determining a direction of a motion vector difference, because occurrence probabilities of directions (−1,0), (0,−1), (1,0), and (0,1) have uniform distributions, CABAC may be decoded in a bypass mode, i.e., in a uniform probability distribution (probability 0.5), thereby promoting coding efficiency improvement and codec throughput improvement.

Hereinafter, a case in which the merge motion vector difference mode is applied in a low delay B frame condition (LDB mode) will be described.

The LDB mode denotes a case in which a B frame is restricted to refer to a temporally same direction. In the LDB mode, i.e., when a reference picture temporally at a same location is referred to, the merge motion vector difference mode may operate as follows. In a bi-directional prediction mode, when two base motion vectors both temporally indicate only the past or the future, the merge motion vector difference mode is applied as follows.

i) Although a base motion vector is a vector for bi-directional prediction, information in one direction may be ignored and motion information of a reference picture list in a remaining direction may be used as a base motion vector. In this case, 1 bit indicating which direction of the motion information is used by transmitting 1 bit is additionally required.

ii) B-directional prediction information is used, but a base motion vector in one direction is fixed and a base motion vector of another direction is changed and used.

iii) A zero motion vector is added to motion information in a fixed direction while other processes are same as ii). At this time, a reference picture index is 0 and the zero motion vector at a picture closest to a current picture is used.

iv) In LDB, a distance corresponding to a merge differential distance index may be used via scaling according to a distance between a current picture and a reference picture, i.e., a POC difference. In other words, when the POC distance difference is 4, the merge differential distance index 0 is 1 (fixed distance). However, when the POC distance difference is 8, the merge differential distance index0 denotes 2, i.e., two times the fixed distance. Accordingly, a wider area may be referred to based on the POC distance difference without having to determine a motion vector difference with a pixel unit pre-determined on a very far reference picture.

v) The above method may be identically applied when reference pictures in a temporally same direction are usable not only in an LDB mode, but also in a general B frame.

Meanwhile, the embodiments of the present disclosure described above may be written as computer-executable programs that may be stored in a medium.

The medium may continuously store the computer-executable programs, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

While one or more embodiments of the present disclosure have been described with reference to the figures, it will be understood by those of ordinary skill in the art that various changes in form and details may be made therein without departing from the spirit and scope as defined by the following claims.

The invention claimed is:

1. A video decoding method comprising:
checking whether a prediction mode of a current block is a skip mode or a merge mode;
when the prediction mode of current block is the skip mode, obtaining, from a bitstream, merge difference mode information indicating whether a prediction mode using a merge motion vector difference and a motion vector determined from a merge candidate list of the current block is applied;
when the prediction mode of the current block is the merge mode, obtaining, from the bitstream, the merge difference mode information of the current block;
when the merge motion vector difference and the motion vector determined from the merge candidate list of the current block are used according to the merge difference mode information, obtaining, from the bitstream, merge candidate information indicating a candidate to be used for the current block in the merge candidate list;
determining a base motion vector from the one candidate determined from the merge candidate list based on the merge candidate information; and
determining a motion vector of the current block by using the base motion vector and the merge motion vector difference,
wherein the merge motion vector difference of the current block is determined by using a distance index of the merge motion vector difference and a direction index of the merge motion vector difference,
the merge difference mode information and the merge candidate information are obtained by performing entropy decoding using context information,
context information for obtaining the merge difference mode information in the skip mode and context information for obtaining the merge difference mode information in the merge mode are the same, and
context information for obtaining the merge candidate information in the skip mode and context information for obtaining the merge candidate information in the merge mode are the same.

2. A video decoding apparatus comprising:
an inter-prediction information obtainer configured to check whether a prediction mode of a current block is a skip mode or a merge mode, when the prediction mode of current block is the skip mode, obtain, from a bitstream, merge difference mode information indicating whether a prediction mode using a merge motion vector difference and a motion vector determined from a merge candidate list of the current block is applied, when the prediction mode of the current block is the merge mode, obtain, from the bitstream, the merge difference mode information of the current block, and when the merge motion vector difference and the motion vector determined from the merge candidate list of the current block are used, obtain, from the bitstream, merge candidate information indicating a candidate to be used for the current block in the merge candidate list;
an inter-prediction performer configured to determine a base motion vector from the one candidate determined from the merge candidate list based on the merge candidate information, and determine a motion vector of the current block by using the base motion vector and the merge motion vector difference; and
a reconstructor configured to reconstruct the current block by using the motion vector,
wherein the merge motion vector difference of the current block is determined by using a distance index of the merge motion vector difference and a direction index of the merge motion vector difference,
the merge difference mode information and the merge candidate information are obtained by performing entropy decoding using context information,
context information for obtaining the merge difference mode information in the skip mode and context information for obtaining the merge difference mode information in the merge mode are the same, and
context information for obtaining the merge candidate information in the skip mode and context information for obtaining the merge candidate information in the merge mode are the same.

3. A video encoding method comprising:
when inter-prediction is performed on a current block in one of a skip mode and a merge mode, determining whether a merge motion vector difference and a base motion vector determined from a merge candidate list of the current block are to be used;
when the merge motion vector difference is to be used, generating merge candidate information indicating one base motion vector used in the current block in the merge candidate list; and
generating a distance index of the merge motion vector difference corresponding to a difference between the base motion vector and a motion vector of the current block, and a direction index of the merge motion vector difference,
wherein the determining of whether the merge motion vector difference and the base motion vector determined from the merge candidate list of the current block are to be used comprises:
when a prediction mode of the current block is the skip mode, generating merge difference mode information indicating whether a prediction mode using the merge motion vector difference and the motion vector determined from the merge candidate list of the current block is applied; and
when the prediction mode of the current block is the merge mode, generating the merge difference mode information of the current block,
wherein the entropy encoding is performed using context information for the merge candidate information and the merge difference mode information, respectively,
context information for the merge difference mode information in the skip mode and context information for the merge difference mode information in the merge mode are the same, and
context information for the merge candidate information in the skip mode and context information for the merge candidate information in the merge mode are the same.

4. A video encoding apparatus comprising:
an inter-prediction performer configured to determine a motion vector of a current block by performing inter-prediction on the current block; and
an inter-prediction information generator configured to, when the inter-prediction is performed on the current block in one of a skip mode and a merge mode, determining whether a merge motion vector difference and a base motion vector determined from a merge candidate list of the current block are to be used, when the merge motion vector difference is to be used, generating merge candidate information indicating the base motion vector used in the current block in the merge candidate list, and generating a distance index of the merge motion vector difference corresponding to a difference between the base motion vector and the motion vector of the current block, and a direction index of the merge motion vector difference, wherein, when a prediction mode of the current block is the skip mode, the inter-prediction information generator is further configured to generate merge difference mode information indicating whether a prediction mode using the merge motion vector difference and the motion vector determined from the merge candidate list of the current block is applied, when the prediction mode of the current block is the merge mode, the inter-prediction information generator is further configured to generate the merge difference mode information of the current block, wherein the entropy encoding is performed using context information for the merge candidate information and the merge difference mode information, respectively, context information for the merge difference mode information in the skip mode and context information for the merge difference mode information in the merge mode are the same, and context information for the merge candidate information in the skip mode and context information for the merge candidate information in the merge mode are the same.

* * * * *